United States Patent
Higeta et al.

(10) Patent No.: US 9,244,198 B2
(45) Date of Patent: Jan. 26, 2016

(54) AZO COMPOUND, DYE-BASED POLARIZING FILM AND POLARIZING PLATE

(75) Inventors: Takahiro Higeta, Tokyo (JP); Takuto Nishiguchi, Tokyo (JP)

(73) Assignees: Nippon Kayaku Kabushiki Kaisha, Tokyo (JP); Polatechno Co., Ltd., Niigata (JP)

( * ) Notice: Subject to any disclaimer, the term of this patent is extended or adjusted under 35 U.S.C. 154(b) by 192 days.

(21) Appl. No.: 13/980,184

(22) PCT Filed: Feb. 6, 2012

(86) PCT No.: PCT/JP2012/000775
§ 371 (c)(1),
(2), (4) Date: Jul. 17, 2013

(87) PCT Pub. No.: WO2012/108169
PCT Pub. Date: Aug. 16, 2012

(65) Prior Publication Data
US 2013/0302538 A1  Nov. 14, 2013

(30) Foreign Application Priority Data
Feb. 7, 2011 (JP) .................... 2011-023747

(51) Int. Cl.
*G02B 1/08* (2006.01)
*C09B 31/30* (2006.01)
*G02B 1/04* (2006.01)
*G02B 5/30* (2006.01)

(52) U.S. Cl.
CPC . *G02B 1/08* (2013.01); *C09B 31/30* (2013.01); *G02B 1/04* (2013.01); *G02B 5/3033* (2013.01); *B32B 2457/202* (2013.01); *Y10T 428/1041* (2015.01)

(58) Field of Classification Search
CPC ...... C09B 1/30; C09B 49/04; C09B 67/0046; C09B 49/0055; G02B 1/04; G02B 1/08; G02B 5/305; G02F 1/133533; Y10T 428/1041; B32B 2457/202
USPC .................. 428/1.31; 349/97; 359/487.02
See application file for complete search history.

(56) References Cited

U.S. PATENT DOCUMENTS

| | | | |
|---|---|---|---|
| 3,005,814 A | 10/1961 | Schweizer et al. | |
| 6,399,752 B1 | 6/2002 | Ohta et al. | |
| 2003/0098447 A1* | 5/2003 | Ashida et al. | 252/585 |
| 2010/0257678 A1 | 10/2010 | Sadamitsu et al. | |
| 2011/0075076 A1* | 3/2011 | Nishiguchi et al. | 349/96 |
| 2013/0314786 A1 | 11/2013 | Higeta et al. | |

FOREIGN PATENT DOCUMENTS

| | | |
|---|---|---|
| JP | 2622748 B2 | 6/1997 |
| JP | 2002-220544 A | 8/2002 |
| JP | 2002-275381 A | 9/2002 |
| JP | 2002-296417 A | 10/2002 |
| JP | 2003-64276 A | 3/2003 |
| JP | 2003-313451 A | 11/2003 |
| JP | 2003-327858 A | 11/2003 |
| JP | 2003313451 A * | 11/2003 ............. C09B 31/22 |
| JP | 2004-51645 A | 2/2004 |
| JP | 2005-255846 A | 9/2005 |
| JP | 2009-115866 A | 5/2009 |
| WO | 2007/148757 A1 | 12/2007 |
| WO | WO 2009142193 A1 * | 11/2009 ............. G02B 5/30 |
| WO | 2012/108173 A1 | 8/2012 |

OTHER PUBLICATIONS

Taiwanese communication, with English translation, dated Jan. 13, 2015 in corresponding Taiwanese patent application No. 101103856.
International Search Report and Written Opinion mailed May 1, 2012 in corresponding PCT application No. PCT/JP2012/000775.
International Preliminary Report on Patentability mailed Aug. 22, 2013 in corresponding PCT application No. PCT/JP2012/000775.
International Search Report and Written Opinion mailed May 1, 2012 in co-pending PCT application No. PCT/JP2012/000784.
International Preliminary Report on Patentability mailed Aug. 22, 2013 in co-pending PCT application No. PCT/JP2012/000784.
Office Action mailed Apr. 9, 2015 in co-pending U.S. Appl. No. 13/983,791.
Taiwanese comminication, with English translation, dated Jan. 13, 2015 in co-pending Taiwanese patent application No. 101103860.
Office action mailed Sep. 9, 2015 in co-pending U.S. Appl. No. 14/813,163.
Notice of Allowance mailed Sep. 28, 2015 in co-pending U.S. Appl. No. 13/983,791.
Office action mailed Sep. 9, 2015 in co-pending U.S. Appl. No. 14/813,166.

* cited by examiner

*Primary Examiner* — Sophie Hon
(74) *Attorney, Agent, or Firm* — Nields, Lemack & Frame, LLC

(57) ABSTRACT

The present invention relates to an azo compound represented by the following formula (1), [wherein, A represents a phenyl group which may have a substituent, $R_1$ to $R_6$ each independently represent a hydrogen atom, an alkyl group having a carbon atom number of 1 to 5, an alkoxy group having a carbon atom number of 1 to 5, a sulfo group, or an alkoxy group having a sulfo group and a carbon atom number of 1 to 5, and X represents an amino group which may have a substituent, a benzoylamino group which may have a substituent, a phenylamino group which may have a substituent, a phenylazo group which may have a substituent, or a naphthotriazole group which may have a substituent] or/and a salt thereof and to a polarizing film and a polarizing plate which contain it.

(1)

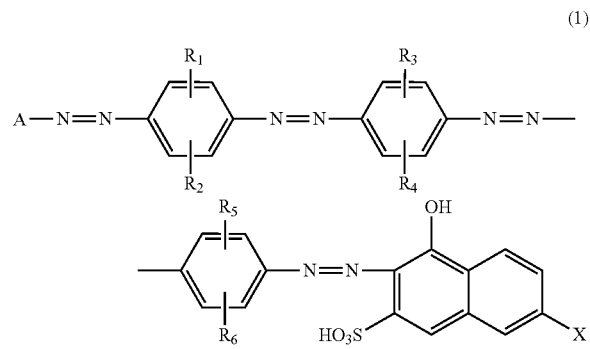

13 Claims, No Drawings

AZO COMPOUND, DYE-BASED POLARIZING FILM AND POLARIZING PLATE

TECHNICAL FIELD

The present invention relates to a novel azo compound, a dye-based polarizing film where said compound is contained in a polarizing raw film, and a polarizing plate comprising said polarizing film.

BACKGROUND ART

The polarizing plate having light transmission/shielding function and also a liquid crystal having light switching function are fundamental components of display devices such as liquid crystal displays (Liquid Crystal Display: LCD). The application field of this LCD has been also broadened from small instruments such as initial electronic calculators and clocks to laptop personal computers, word processors, liquid crystal projectors, liquid crystal televisions, car navigation systems and indoor-outdoor measurement instruments, and the like. In addition, the polarizing plate can be also applied to a lens having polarization function, and has been applied to sunglasses with visibility being improved and also, in recent years, polarized glasses for 3D televisions, and the like. Due to the wide range application of the polarizing plate as above, use conditions also widely vary from low temperature to high temperature, from low humidity to high humidity, and from low light amount to high light amount, so a polarizing plate having high polarization performance and excellent durability is required.

At present, the polarizing film is manufactured by dyeing, with iodine or a dichroic dye as a dichroic coloring matter, a polarizing raw film such as a film formed by stretching and orienting polyvinyl alcohol or a derivative thereof or a polyene-based film formed by producing a polyene by dehydrochlorination of a polyvinyl chloride film or by dehydration of a polyvinyl alcohol-based film and then orienting the polyene, or manufactured by allowing iodine or a dichroic dye as a dichroic coloring matter to be contained in the polarizing raw film. Among them, the iodine-based polarizing film using iodine as a dichroic coloring matter has excellent polarization performance but is vulnerable to water and heat, and thus it has a problem with its durability when used in the state of high temperature and high humidity for a long period of time. Some solution methods have been considered, such as treatment with formalin or an aqueous solution containing boric acid and use of a polymer film having a low water-vapor transmission ratio as a protective film, in order to improve durability. However, their effects are not sufficient. On the other hand, the dye-based polarizing film using a dichroic dye as a dichroic coloring matter is excellent in moisture fastness and heat fastness as compared with the iodine-based polarizing film but generally has insufficient polarization performance.

In a neutral-color polarizing film formed by adsorption of a few kinds of dichroic dyes into a polymer film and by orientation, if light-leakage (color-leakage) of a certain wavelength in a visible light wavelength region occurs in the state where two polarizing films are superposes so that their orientation direction are orthogonal (in the orthogonal position), the hue of a liquid crystal display could change in a dark state when the polarizing film is provided on a liquid crystal panel. In order to prevent that, the transmittance in the orthogonal position (orthogonal transmittance) in the visible light wavelength region of said neutral-color polarizing film must be uniformly reduced.

Meanwhile, in the case of a color liquid crystal projection-type display, i.e., a color liquid crystal projector, a polarizing plate is used in its liquid crystal image formation part. Previously, an iodine-based polarizing plate having good polarization performance and exhibiting neutral gray was used. However, the iodine-based polarizing plate has a problem of insufficiency in light fastness, heat fastness and wet-heat fastness because iodine is used as a dichroic coloring matter as described above. In order to solve this problem, a dye-based neutral-gray polarizing plate using a dichroic dye as a dichroic coloring matter has been increasingly used. For this neutral-gray polarizing plate, coloring matters of three primary colors are usually used in combination in order to averagely improve the transmittance in all visible light wavelength regions and polarization performance. For this reason, there is a problem that, like a color liquid crystal projector, the light transmittance is inadequate for market need of further brightness so the light source intensity must be higher in order for further brightness. In order to solve this problem, three polarizing plates corresponding to three primary colors, i.e., for blue channel, green channel and red channel, have been increasingly used.

However, reduction in brightness cannot be avoided due to considerable absorption of light by a polarizing plate, enlargement of an image having a small area of 0.5-3 inches to a few dozen-hundred inches, and so on, and therefore as its light source, one having higher luminance is used. Additionally, further improvement of brightness is firmly required for the liquid crystal projector, and naturally as a result, intensity of a light source used has been increasingly enhanced. This also involves increase in light and heat on a polarizing plate.

The dye used for manufacturing the above-described dye-based polarizing film includes, for example, water-soluble azo compounds described in Patent Literature 1 to Patent Literature 7, and the like.

However, conventional polarizing plates containing the above water-soluble dye have yet to sufficiently satisfy market needs from the viewpoint of polarization properties, absorption in wavelength region, hue and the like. In addition, for the three polarizing plates corresponding to three primary colors for a color liquid crystal projector, i.e., for blue channel, green channel and red channel, there is no polarizing plate having brightness and polarization performance and being good in all of durability under high temperature and high humidity conditions and also fastness to light exposure for a long period of time, so improvement thereof is desired.

RELATED TECHNICAL LITERATURE

Patent Literature

Patent Literature 1: Patent No. 2622748 A
Patent Literature 2: Japanese Patent Laid-Open No. 2001-33627 A
Patent Literature 3: Japanese Patent Laid-Open No. 2004-51645 A
Patent Literature 4: WO 2005/075572
Patent Literature 5: WO 2007/148757
Patent Literature 6: Japanese Patent Laid-Open No. 2003-327858 A
Patent Literature 7: Japanese Patent Laid-Open No. 2005-255846 A
Patent Literature 8: Japanese Patent Laid-Open No. 2004-075719 A

Non-Patent Literature

Non-Patent Literature 1: "Dye Chemistry" written by Yutaka Hosoda

SUMMARY OF THE INVENTION

Problems to be Solved by the Invention

One of the objects of the present invention is to provide a high-performance polarizing plate having excellent polarization performance and moisture, heat and light fastnesses. In addition, another object of the present invention is to provide a neutral-color polarizing plate formed by adsorption of two kinds or more of dichroic dyes into a polymer film and by orientation, where the polarizing plate is a high-performance polarizing plate causing no color-leakage in the orthogonal position in the visible light wavelength region and having excellent polarization performance and moisture, heat and light fastnesses.

A further object is to provide a high-performance polarizing plate, particularly a color polarizing plate, corresponding to three primary colors for a color liquid crystal projector and being good in all of brightness, polarization performance, durability and light fastness.

Means of Solving the Problems

The present inventors have intensively studied to achieve the objects and found that a polarizing film and a polarizing plate containing a certain azo compound and a salt thereof have excellent polarization performance and moisture, heat and light fastnesses, and thus the present invention has been completed.

That is, the present invention relates to the below-described invention.

(1) An azo compound represented by the following formula (1):

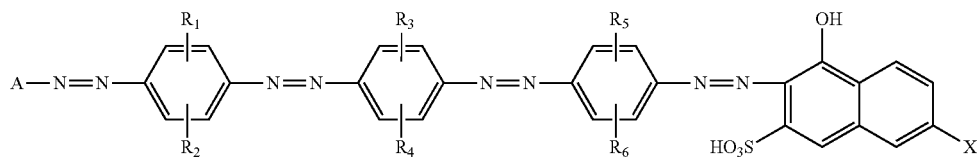

wherein, A represents a phenyl group which may have a substituent, $R_1$ to $R_6$ each independently represent a hydrogen atom, an alkyl group having a carbon atom number of 1 to 5, an alkoxy group having a carbon atom number of 1 to 5, or an alkoxy group having a sulfo group and a carbon atom number of 1 to 5, X represents a benzoylamino group which may have a substituent, a phenylamino group which may have a substituent, a phenylazo group which may have a substituent, or a naphthotriazole group which may have a substituent, or/and a salt thereof.

(2) The azo compound or/and a salt thereof according to the above-described (1), wherein X is a benzoylamino group which may have a substituent, a phenylamino group which may have a substituent, a phenylazo group which may have a substituent, or a naphthotriazole group which may have a substituent, and these substituents are an alkyl group having a carbon atom number of 1 to 5, an alkoxy group having a carbon atom number of 1 to 5, a hydroxy group, a carboxy group, a sulfo group, an amino group or a substituted amino group.

(3) The azo compound or/and a salt thereof according to the above-described (1) or (2), wherein X is a phenylamino group represented by the following formula (2):

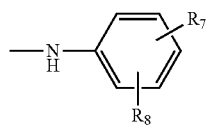

wherein, $R_7$ and $R_8$ each independently represent a hydrogen atom, a methyl group, a methoxy group, a sulfo group, an amino group or a substituted amino group.

(4) The azo compound or/and a salt thereof according to any of the above-described (1) to (3), wherein X is a benzoylamino group represented by the following formula (3):

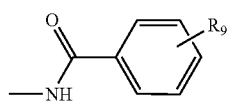

(wherein, $R_9$ represents a hydrogen atom, a hydroxy group, amino group or a substituted amino group.).

(5) The azo compound or/and a salt thereof according to any one of the above-described (1) to (4), wherein X is a naphthotriazole group represented by the following formula (4):

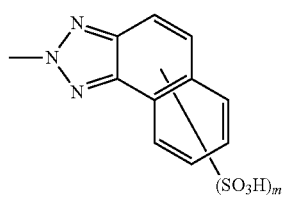

(wherein, m represents 1 or 2.).

(6) The azo compound or/and a salt thereof according to any one of the above-described (1) to (5), wherein X is a phenylazo group represented by the following formula (5):

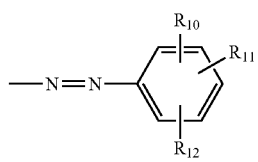

(wherein, $R_{10}$ to $R_{12}$ each independently represent a hydrogen atom, a hydroxy group, an alkyl group having a carbon atom number of 1 to 5, an alkoxy group having a carbon atom number of 1 to 5, an amino group or a substituted amino group.).

(7) The azo compound or/and a salt thereof according to any one of the above-described (1) to (6), wherein at least one of substituents of A is a sulfo group or a carboxy group, and a substituent other than that is not present or is a sulfo group, an alkyl group having a carbon atom number of 1 to 5, an alkoxy group having a carbon atom number of 1 to 5, an alkoxy group having a sulfo group and a carbon atom number of 1 to 5, a carboxy group, a nitro group, an amino group or a substituted amino group.

(8) The azo compound or/and a salt thereof according to any one of the above-described (1) to (6), wherein A is represented by the following formula (6):

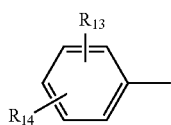

(wherein, one of $R_{13}$ and $R_{14}$ is a sulfo group and the other represents a hydrogen atom, a sulfo group, an alkyl group having a carbon atom number of 1 to 5, or an alkoxy group having a carbon atom number of 1 to 5.).

(9) The azo compound or/and a salt thereof according to any one of the above-described (1) to (8), wherein $R_1$ to $R_6$ are each independently a hydrogen atom, a methyl group, a methoxy group, a sulfo group, an alkoxy group having a sulfo group and a carbon atom number of 1 to 5.

(10) The azo compound or/and a salt thereof according to any one of the above-described (1) to (9), which is represented by the following formula (7):

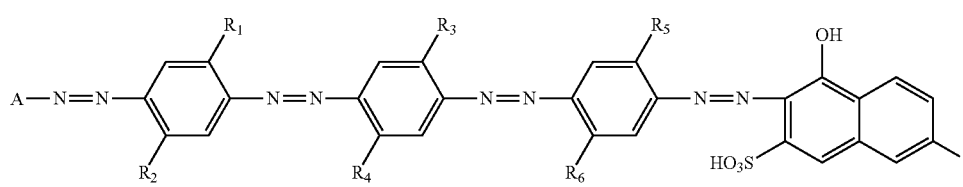

(wherein, A, $R_1$ to $R_6$ and X have the same meanings as in the formula (1).).

(11) The azo compound or/and a salt thereof according to the above-described (1) or (10), wherein A is a disulfo-substituted phenyl group, $R_2$, $R_4$ and $R_6$ are each independently a methyl group or a methoxy group, $R_1$ and $R_3$ are each independently a hydrogen atom, a methyl group, a methoxy group or a sulfopropoxy group, $R_5$ is a methyl group or a methoxy group, and X is a unsubstituted phenylamino group, a phenylamino group having at least one group selected from the group consisting of a methoxy group, a sulfo group and an amino group as a substituent, a benzoylamino group substituted with an amino group, or disulfo-substituted naphthotriazole.

(12) The azo compound or/and a salt thereof according to the above (11), Wherein $R_2$ and $R_4$ are methyl groups, $R_6$ is a methyl group or a methoxy group, and X is an unsubstituted phenyl group or a methoxy-substituted phenyl group.

(13) A dye-based polarizing film containing the azo compound or/and a salt thereof according to any one of the above-described (1) to (12) in a polarizing raw film.

(14) A dye-based polarizing film containing at least one kind of the azo compound or/and a salt thereof according to any one of the above-described (1) to (12) and at least one kind of other organic dyes in a polarizing raw film.

(15) A dye-based polarizing film containing at least two kinds of the azo compound or/and a salt thereof according to any one of the above-described (1) to (12) and at least one kind of other organic dyes in a polarizing raw film.

(16) A color dye-based polarizing film containing at least one kind of the azo compound or/and a salt thereof according to any one of the above-described (1) to (12) in a polarizing raw film.

(17) The dye-based polarizing film according to any one of the above-described (13) to (16), wherein the polarizing raw film is a film comprising a polyvinyl alcohol resin, a vinyl alcohol copolymer resin or a modified polyvinyl alcohol resin.

(18) The dye-based polarizing film according to the above-described (17), wherein the polarizing raw film is a polyvinyl alcohol resin film.

(19) A dye-based polarizing plate with a transparent protective film being attached on at least one surface of the dye-based polarizing film according to any one of the above-described (13) to (18).

(20) Use of the dye-based polarizing film according to any one of the above-described (13) to (18) or the dye-based polarizing plate according to the above-described (19) for manufacturing a liquid crystal display.

(21) Use of the dye-based polarizing film according to any one of the above-described (13) to (18) or the dye-based polarizing plate according to the above-described (19) for manufacturing a liquid crystal projector.

(22) A liquid crystal display equipped with the dye-based polarizing plate according to the above-described (19).

Effect of the Invention

The azo compound and a salt thereof of the present invention are useful as a dye for a polarizing film and have high water-solubility. And polarizing films containing these compounds have high optical performance (for example, high polarization ratio and high contrast) comparable to the polarizing film using iodine and are excellent in durability. For that reason, they are suitable for various liquid crystal display bodies and liquid crystal projectors, in-vehicle application requiring high optical performance and durability, and display application in industrial instruments used in various environments Mode for Carrying Out the Invention The azo compound or/and a salt thereof of the present invention is represented by the above-described formula (1). In the formula (1), A represents a phenyl group which may have a substituent, $R_1$ to $R_6$ each independently represent a hydrogen atom, an alkyl group having a carbon atom number of 1 to 5, an alkoxy group having a carbon atom number of 1 to 5, a sulfo group, or an alkoxy group having a sulfo group and a carbon atom number of 1 to 5, and X represents a benzoylamino group which may have a substituent, a phenylamino group which may have a substituent, a phenylazo group which may have a substituent, or a naphthotriazole group which may have a substituent.

Hereinafter, the compound of the formula (1) will be explained. The term "lower" in the following substituents and the like means a carbon atom number of 1 to 5 and preferably a carbon atom number of 1 to 3.

In the formula (1), A represents a phenyl group which may have a substituent.

The substituent on the phenyl group in A includes a sulfo group, a lower alkyl group, a lower alkoxy group, a lower alkoxy group having a sulfo group, a carboxy group, a sulfo-substituted naphthotriazole group, a nitro group, an amino group, or a substituted amino group.

A preferably has at least one sulfo group as a substituent. In addition, when it has two or more substituents, one of its substituents is a sulfo group or a carboxy group (preferably, sulfo group) and the other substituent(s) is preferably a sulfo group, a lower alkyl group, a lower alkoxy group, a lower alkoxy group having a sulfo group, a carboxy group, a nitro group, an amino group or a substituted amino group. The above-described lower alkoxy group having a sulfo group is preferably straight-chain alkoxy, where the substitution position of the sulfo group is preferably a terminal of the alkoxy group, and is more preferably a 3-sulfopropoxy group and a 4-sulfobutoxy group. The substituted amino group can include an acetylamino group and the like. Among the above-described other substituents, a sulfo group, a lower alkyl group or a lower alkoxy group are more preferable.

In addition, in some cases, more preferable substituents among the above-described other substituents can also include a sulfo group, a methyl group, an ethyl group, a methoxy group, an ethoxy group, a carboxy group, a nitro group and an amino group. The number of substituents on the phenyl group in A is preferably 2, and the substitution position is not particularly limited but preferably a combination of the 2-position and the 4-position.

In the formula (1), A is preferably one represented by the following formula (6).

Formula (6)

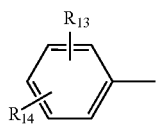

(6)

In the formula, one of $R_{13}$ and $R_{14}$ is a sulfo group and the other represents a hydrogen atom, a sulfo group, an alkyl group having a carbon atom number of 1 to 5, or an alkoxy group having a carbon atom number of 1 to 5. The more preferable group as A is a disulfophenyl group and it is most preferably a 2,4-disulfophenyl group.

X represents a benzoylamino group which may have a substituent, a phenylamino group which may have a substituent, a phenylazo group which may have a substituent, or a naphthotriazole group which may have a substituent. X may have a substituent, and for example, its substituent in the case of a benzoylamino group, a phenylamino group or a phenylazo group, is preferably a lower alkyl group, a lower alkoxy group, a hydroxy group, a carboxy group, a sulfo group, an amino group or a substituted amino group, and its substituent in the case of a naphthotriazole group is preferably a sulfo group. The substituted amino group can include an acetylamino group and the like.

In the formula (1), the preferable group for X can include groups represented by the following formulas (2) to (5). In this regard, the substituted amino group in $R_7$ to $R_{12}$ in the formula (2), the formula (3) and the formula (5) can include an acetylamino group and the like. A phenylamino group represented by the formula (2):

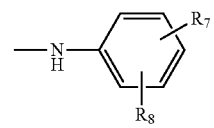

(2)

wherein, $R_7$ and $R_8$ each independently represent a hydrogen atom, a methyl group, a methoxy group, a sulfo group, an amino group or a substituted amino group.

A benzoylamino group represented by the formula (3):

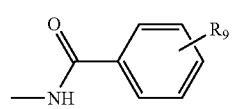

(3)

wherein, $R_9$ represents a hydrogen atom, a hydroxy group, an amino group or a substituted amino group.

A naphthotriazole group represented by the formula (4):

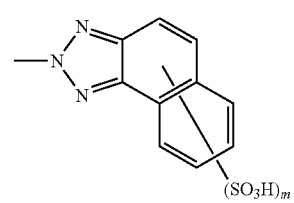

(4)

wherein, m represents 1 or 2.

A phenylazo group represented by the formula (5):

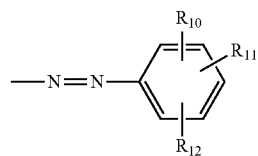

(5)

(wherein, $R_{10}$ to $R_{12}$ each independently represent a hydrogen atom, a hydroxy group, a lower alkyl group, a lower alkoxy group, an amino group or a substituted amino group. In this regard, "lower" represents a carbon atom number of 1 to 5.).

When X is a phenylamino group which may have a substituent, its substituent is preferably a methyl group, a methoxy group, an amino group, a substituted amino group (preferably acetylamino group) or a sulfo group, and more preferably a methyl group, a methoxy group or an amino group. The number and substitution position of said substituent on the phenyl group are not particularly limited. Usually, the number of substituents is preferably 0 to 2, and when a substituent other than hydrogen is present, it is preferred that at least one substituent is present at the p-position relative to the bond position of the amino group. The phenylamino group which may have said substituent is preferably a phenylamino group represented by the above-described formula (2), $R_7$ and $R_8$ are each independently, preferably a hydrogen atom, a methyl group, a methoxy group or an amino group. In the formula (2), when a group other than a hydrogen atom is present, it is preferred that at least one is present at the p-position.

The phenylamino group which may have a substituent includes, for example, a phenylamino group, a 4-methylphenylamino group, a 4-methoxy phenylamino group, a 4-aminophenylamino group, a 4-amino-2-sulfophenylamino group, a 4-amino-3-sulfophenylamino group, a 4-sulfomethylaminophenylamino group, a 4-carboxyethylaminophenylamino group or the like. Among them, an unsubstituted phenylamino group and a p-methoxy phenylamino group are more preferable.

When X is a benzoylamino group which may have a substituent, its substituent is preferably an amino group, a substituted amino group (preferably acetylamino group) and a hydroxy group, more preferably an amino group and a substituted amino group (preferably acetylamino group), and further preferably an amino group. The number and substitution position of said substituent on the phenyl group are not particularly limited, but the number is preferably usually 0 to 1. When a substituent other than a hydrogen atom is present, the position is preferably the p-position.

When X is a benzoylamino group, a benzoylamino group represented by the above formula (3) is preferable. $R_9$ represents a hydrogen atom, a hydroxy group, an amino group or a substituted amino group, and is preferably a hydrogen atom, an amino group or a substituted amino group (preferably acetylamino group). The substitution position of $R_9$ is preferably the p-position. Said benzoylamino group includes, for example, a benzoylamino group, a 4-aminobenzoylamino group, a 4-hydroxybenzoylamino group or a 4-(3-carboxy-1-oxopropylamino)benzoylamino group, a 4-(2-carbomethoxy-1-oxoethylamino)benzoylamino group and the like. Among said benzoylamino groups, the aminobenzoylamino group is more preferably.

When X is a naphthotriazole group which may have a substituent, a naphthotriazole group having a sulfone group represented by the above formula (4) is preferable. m in the formula (4) represents 1 or 2 and is preferably 2. Said naphthotriazole includes, for example, a 6,8-disulfonaphthotriazole group, a 7,9-disulfonaphthotriazole group, a 7-sulfonaphthotriazole group, a 5-sulfonaphthotriazole group or the like.

When X is a phenylazo group which may have a substituent, its substituent can include a hydroxy group, an alkyl group having a carbon atom number of 1 to 5, an alkoxy group having a carbon atom number of 1 to 5, an amino group or a substituted amino group, and is preferably a hydroxy group, an amino group, a methyl group, a methoxy group or a carboxy group and more preferably a hydroxy group. The number of substituents is usually 0 to 3 and preferably 1 to 2.

When X is said phenylazo group, a phenylazo group represented by the above formula (5) is preferable. $R_{10}$ to $R_{12}$ in the formula (5) each independently represent a hydrogen atom, a hydroxy group, a lower alkyl group, a lower alkoxy group, an amino group or a substituted amino group (preferably acetylamino group). The number of substituents is preferably 0 to 2, and in some cases, 1 is also preferable. The substituent is more preferably a hydroxy group, an amino group or a substituted amino group. The phenylazo group includes, for example, a 2-methylphenylazo group, a 3-methylphenylazo group, a 2,5-dimethylphenylazo group, a 3-methoxyphenylazo group, a 2-methoxy-5-methylphenylazo group, a 2,5-dimethoxyphenylazo group, a 4-aminophenylazo group, a 4-hydroxyphenylazo group, a 4-carboxyethylaminophenylazo group or the like, and is preferably a 4-aminophenylazo group, a 4-hydroxyphenylazo group or a 4-carboxyethylaminophenylazo group.

For X, among the groups represented by the above formula (2) to (5), the groups represented by the formula (2) to (4) are more preferable, the phenylamino group represented by the formula (2) and the naphthotriazole group represented by the formula (4) are further preferable, and the phenylamino group represented by the formula (2) is most preferable.

In the formula (1), $R_1$ to $R_6$ each independently represent a hydrogen atom, a lower alkyl group, a lower alkoxy group, a sulfo group, or a lower alkoxy group having a sulfo group (hereinafter, which is also referred to as sulfo-substituted lower alkoxy group), and are preferably a hydrogen atom, a methyl group, an ethyl group, a methoxy group, an ethoxy group and a sulfopropoxy group. And, the lower alkoxy moiety in the sulfo group-substituted lower alkoxy group is preferably a straight-chain, and the substitution position of the sulfo group is preferably a terminal of the alkoxy group. The more preferable sulfo group-substituted lower alkoxy group is a 3-sulfopropoxy group or a 4-sulfobutoxy group. The case is more preferable where $R_1$ to $R_6$ are each independently a hydrogen atom, a methyl group, a methoxy group or a 3-sulfopropoxy group. The substituent position on the benzene ring for a group other than a hydrogen atom can include, when the bond position of the azo group on A side is defined as the 1-position, the 2-position only, the 5-position only, a combination of the 2-position and the 6-position, a combination of the 2-position and the 5-position, a combination of the 3-position and the 5-position, and the like, independently on each benzene ring, and is preferably the 2-position only, the 5-position only, and a combination of the 2-position and the 5-position. In this regard, the term "the 2-position only, the 5-position only" in the above indicates that each benzene ring independently has one substituent other than a hydrogen atom only on the 2-position or the 5-position.

The compound with $R_1$ to $R_6$ on preferable substitution positions can include a compound represented by the following formula (7) with a combination of the 2-position and the 5-position.

Formula (7)

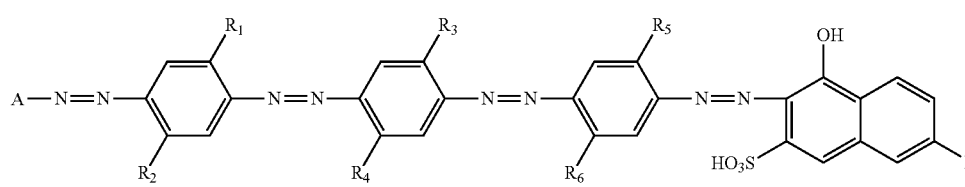

In the formula, A, $R_1$ to $R_6$ and X have the same meanings as in the formula (1).

A preferable combination of $R_1$ to $R_6$ in the above formula (1) or the above-described formula (7) can include a case where $R_2$, $R_4$ and $R_6$ are each independently a lower alkyl group or a lower alkoxy group (preferably methyl group or methoxy group), $R_1$ and $R_3$ are each independently a hydrogen atom, a lower alkyl group (preferably methyl group), a lower alkoxy group (preferably methoxy group) or a sulfo-substituted lower alkoxy group (preferably sulfopropoxy group), and R$_5$ is a lower alkyl group or a lower alkoxy group (preferably methyl group or methoxy group). In this case, it is more preferable that at least any one of R$_1$ and R$_3$ is a sulfo-substituted lower alkoxy group (preferably sulfopropoxy group) or that both R$_1$ and R$_3$ are hydrogen atoms, and it is further preferable that both R$_1$ and R$_3$ are hydrogen atoms.

Among azo compounds represented by the formula (1), the preferable compound can include a compound according to the below-described (I) to (V).

(I) An azo compound represented by the above formula (1), wherein A is a disulfophenyl group, R$_2$, R$_4$ and R$_6$ are each independently a lower alkyl group or a lower alkoxy group, R$_1$ and R$_3$ are each independently a hydrogen atom, a lower alkyl group, a lower alkoxy group or a sulfo-substituted lower alkoxy group, R$_5$ is a lower alkyl group or a lower alkoxy group, X is a unsubstituted phenylamino group, or a phenylamino group having the below-described substituent, an unsubstituted benzoylamino group, a benzoylamino group having the below-described substituent, or a disulfo-substituted naphthotriazole group, and the substituent in the phenylamino group having a substituent and the benzoylamino group having a substituent is at least one selected from the group consisting of a sulfo group, a lower alkoxy group and an amino group, or/and a salt thereof.

(II) The azo compound or/and a salt thereof according to the above-described (I), wherein the compound of the formula (1) is an azo compound represented by the above formula (7).

(III) The azo compound or/and a salt thereof according to the above-described (I) or (II), wherein at least any one of R$_1$ and R$_3$ is a sulfo-substituted lower alkoxy group.

(IV) The azo compound or/and a salt thereof according to any one of the above-described (I) to (III), wherein both R$_1$ and R$_3$ are hydrogen atoms.

(V) The azo compound or/and a salt thereof according to any one of the above-described (I) to (IV), wherein the lower alkyl group is a methyl group, the lower alkoxy group is a methoxy group, and the sulfo-substituted lower alkoxy group is a sulfo-substituted propoxy group.

Next, specific examples of the azo compounds represented by the above formula (1) used in the present invention are shown in the following tables A to H. In this regard, the sulfo group, the carboxy group and the hydroxy group in the formula are shown in free acid form.

TABLE A

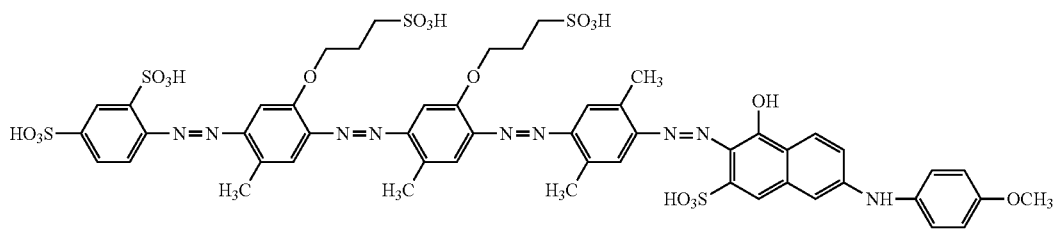 [SMILES: COc1ccc(Nc2ccc3c(O)c(N=Nc4cc(C)c(N=Nc5cc(C)c(N=Nc6cc(C)c(N=Nc7ccc(S(=O)(=O)O)cc7S(=O)(=O)O)cc6OCCCS(=O)(=O)O)cc5OCCCS(=O)(=O)O)cc4C)c(S(=O)(=O)O)cc3c2)cc1]
(8)

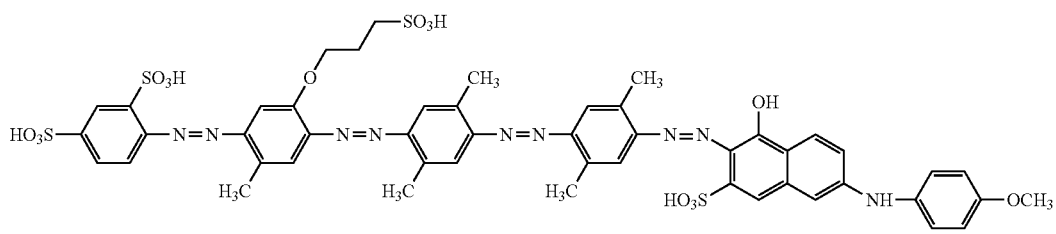
(9)

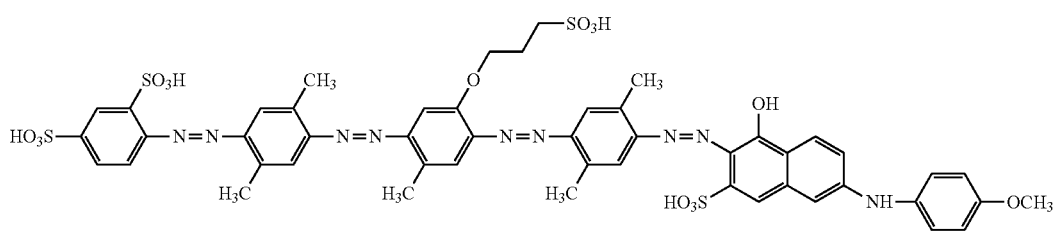 [SMILES: COc1ccc(Nc2ccc3c(O)c(N=Nc4cc(C)c(N=Nc5cc(C)c(N=Nc6cc(C)c(N=Nc7ccc(S(=O)(=O)O)cc7S(=O)(=O)O)cc6C)cc5OCCCS(=O)(=O)O)cc4C)c(S(=O)(=O)O)cc3c2)cc1]
(10)

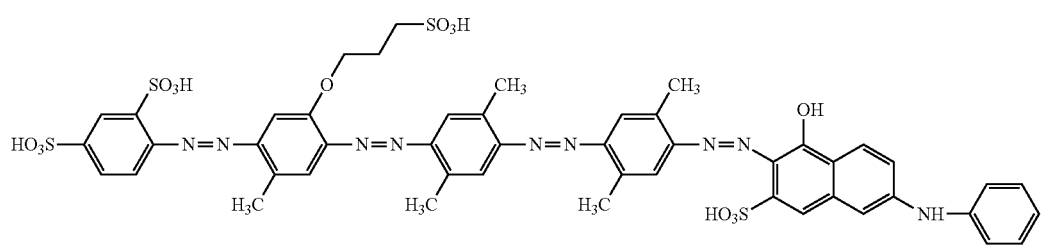 [SMILES: Cc1cc(N=Nc2cc(C)c(N=Nc3ccc(S(=O)(=O)O)cc3S(=O)(=O)O)cc2OCCCS(=O)(=O)O)c(C)cc1N=Nc1cc(C)c(N=Nc2c(S(=O)(=O)O)cc3cc(Nc4ccccc4)ccc3c2O)cc1C]
(11)

TABLE A-continued
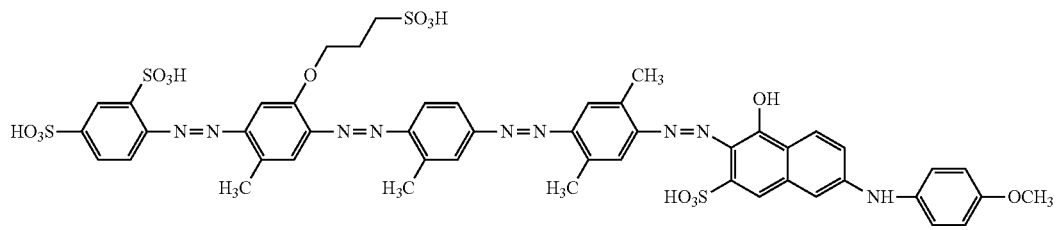 [SMILES: COc1ccc(Nc2ccc3c(O)c(N=Nc4cc(C)c(N=Nc5ccc(N=Nc6cc(C)c(N=Nc7ccc(S(=O)(=O)O)cc7S(=O)(=O)O)cc6OCCCS(=O)(=O)O)c(C)c5)cc4C)c(S(=O)(=O)O)cc3c2)cc1]
(12)
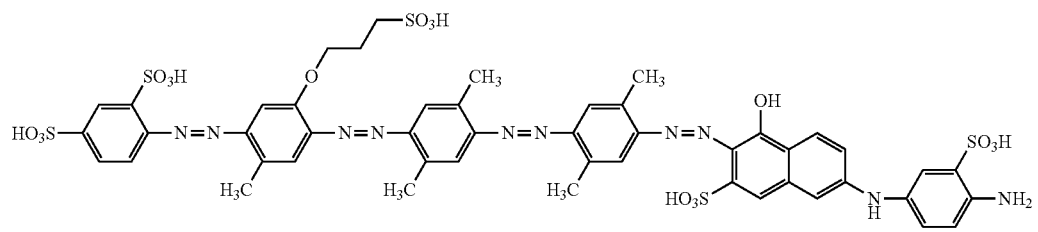 [SMILES: Cc1cc(N=Nc2cc(C)c(N=Nc3ccc(S(=O)(=O)O)cc3S(=O)(=O)O)cc2OCCCS(=O)(=O)O)c(C)cc1N=Nc1cc(C)c(N=Nc2c(S(=O)(=O)O)cc3cc(Nc4ccc(N)c(S(=O)(=O)O)c4)ccc3c2O)cc1C]
(13)
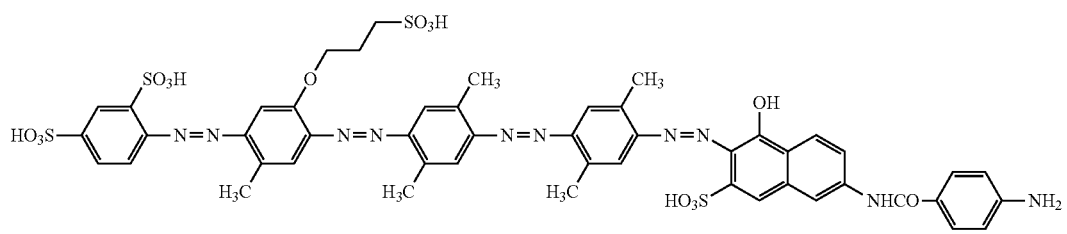
(14)
TABLE B
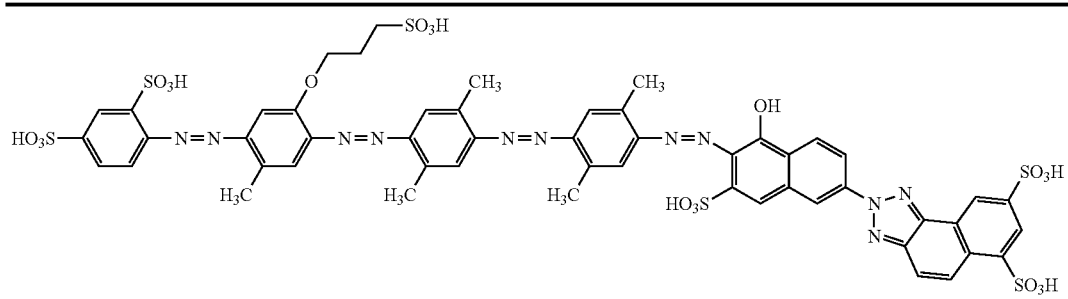
(15)
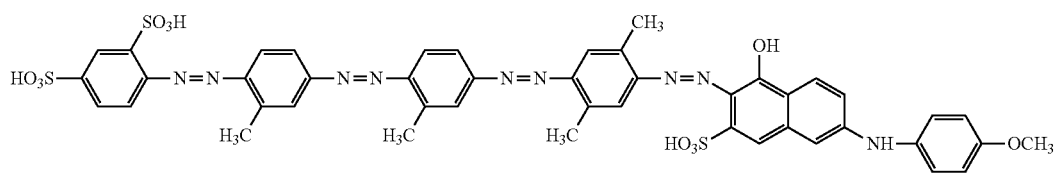
(16)
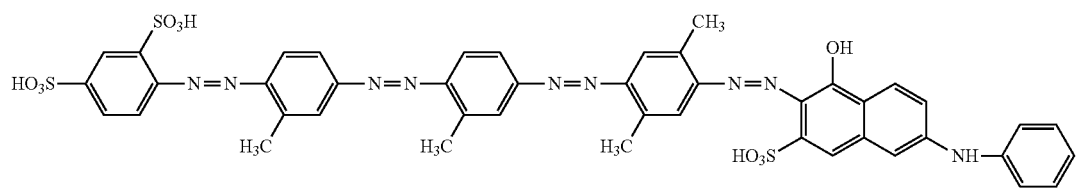
(17)
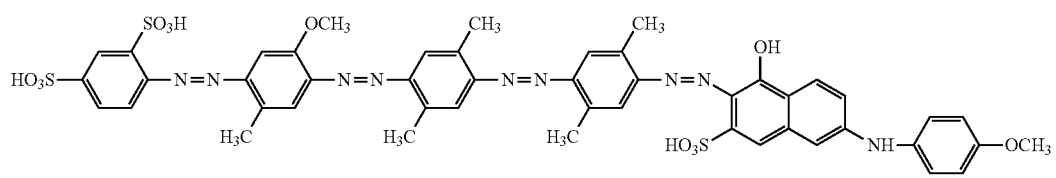 [SMILES: COc1ccc(Nc2ccc3c(O)c(N=Nc4cc(C)c(N=Nc5cc(C)c(N=Nc6cc(C)c(N=Nc7ccc(S(=O)(=O)O)cc7S(=O)(=O)O)cc6OC)cc5C)cc4C)c(S(=O)(=O)O)cc3c2)cc1]
(18)

TABLE B-continued
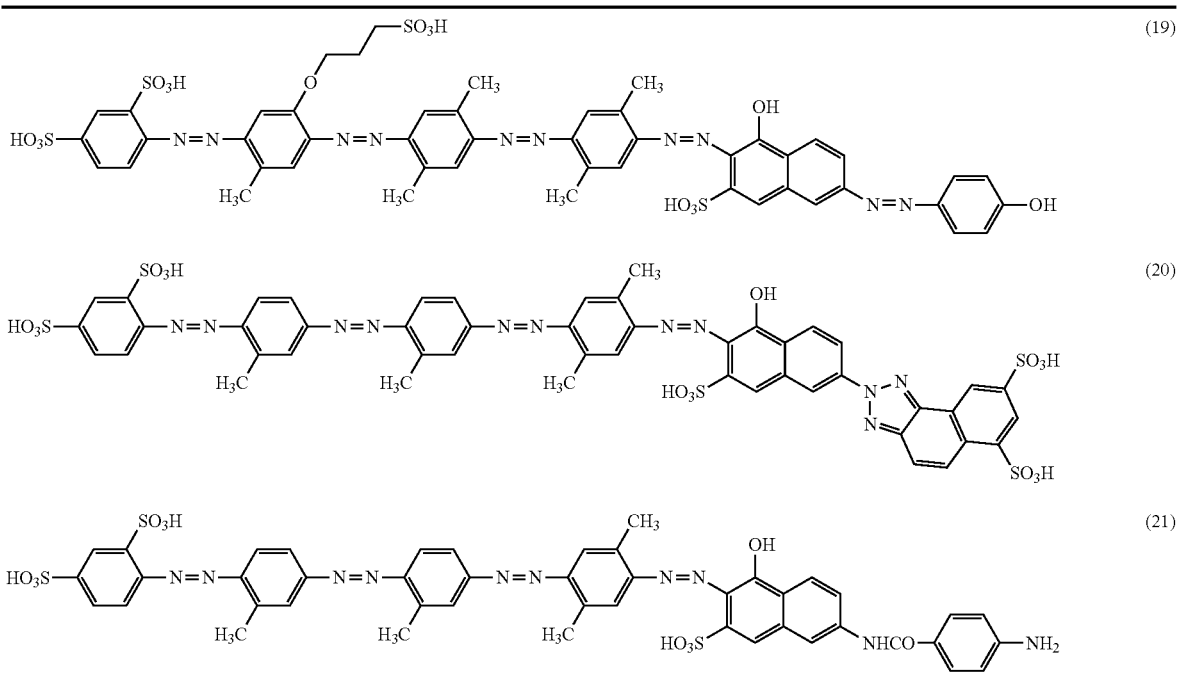
TABLE C
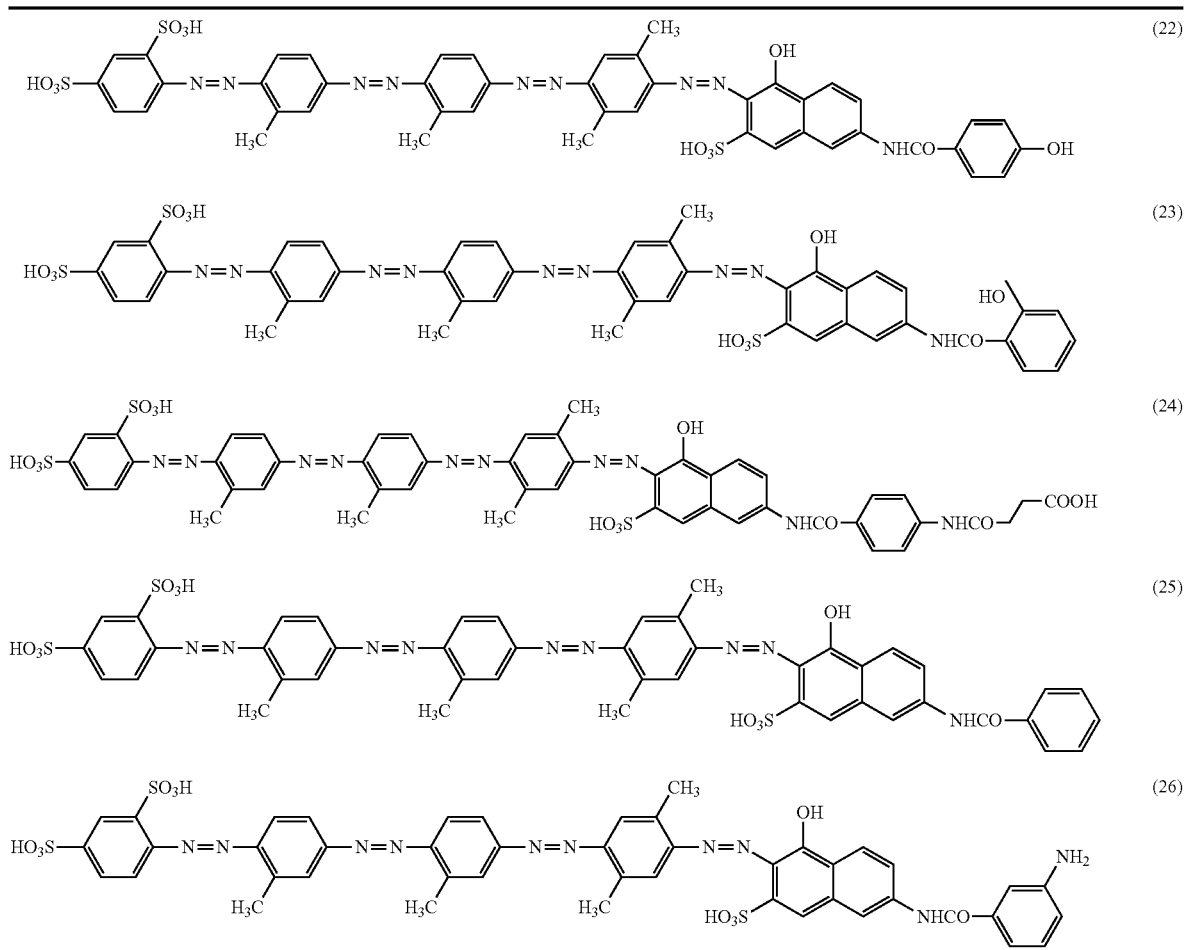

TABLE C-continued
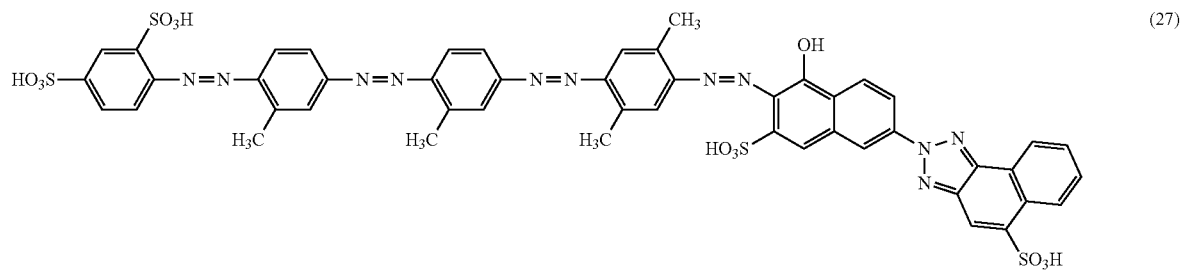
(27)
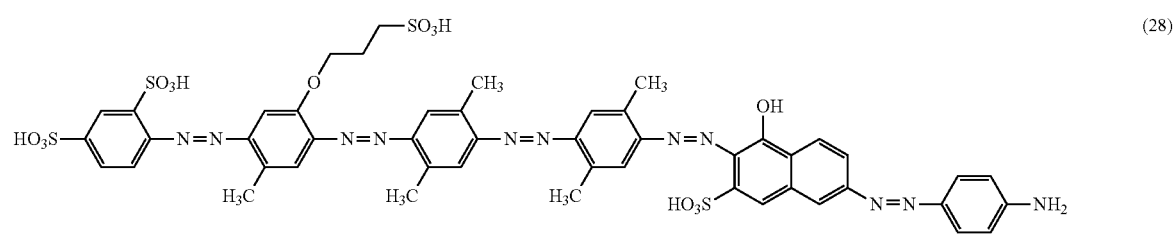
(28)
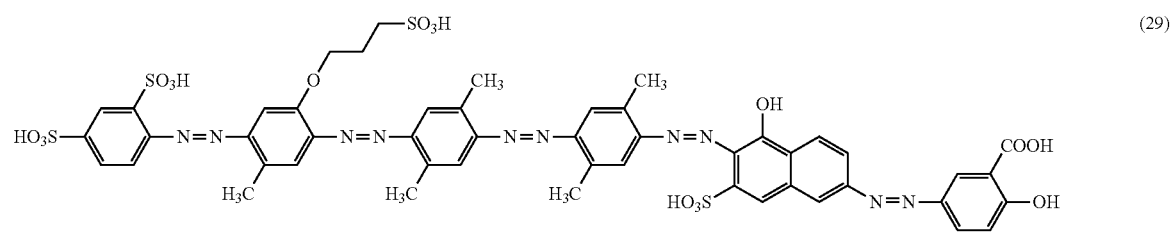
(29)
TABLE D
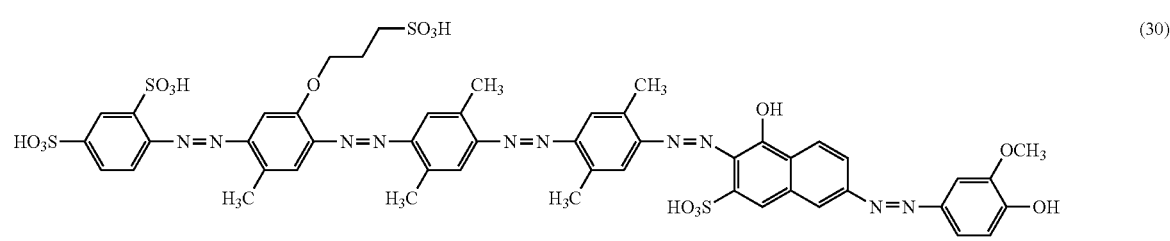
(30)
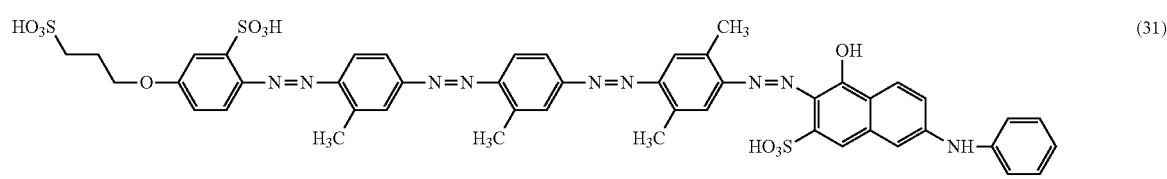
(31)
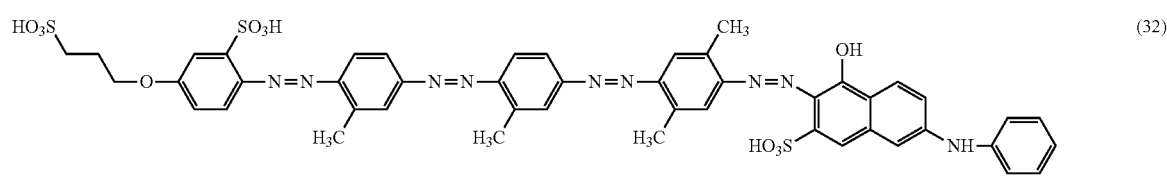
(32)

TABLE D-continued
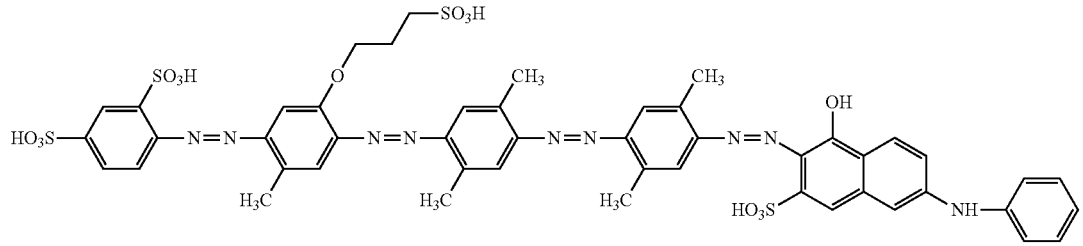 [SMILES: Cc1cc(N=Nc2cc(C)c(N=Nc3ccc(S(=O)(=O)O)cc3S(=O)(=O)O)cc2OCCCS(=O)(=O)O)c(C)cc1N=Nc1cc(C)c(N=Nc2c(S(=O)(=O)O)cc3cc(Nc4ccccc4)ccc3c2O)cc1C]
(33)
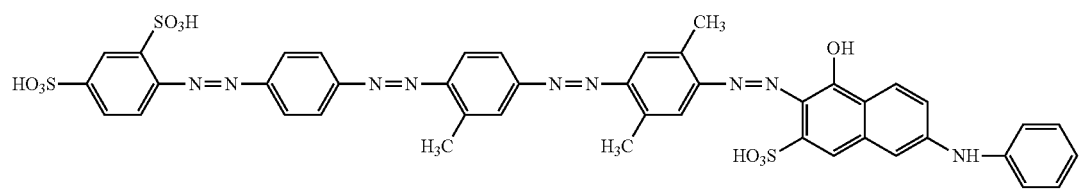
(34)
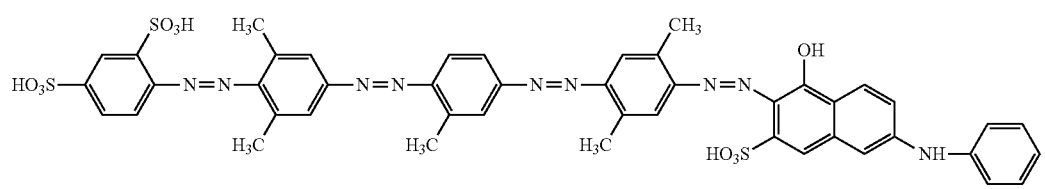 [SMILES: Cc1cc(N=Nc2cc(C)c(N=Nc3c(S(=O)(=O)O)cc4cc(Nc5ccccc5)ccc4c3O)cc2C)ccc1N=Nc1cc(C)c(N=Nc2ccc(S(=O)(=O)O)cc2S(=O)(=O)O)c(C)c1]
(35)
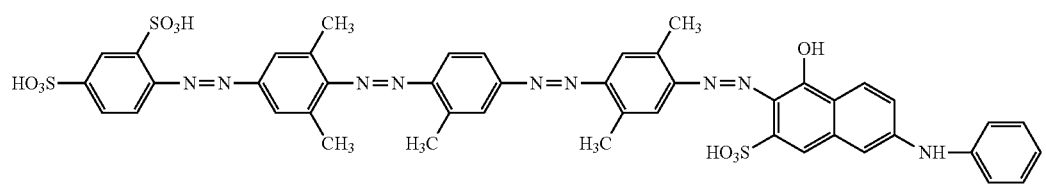 [SMILES: Cc1cc(N=Nc2c(S(=O)(=O)O)cc3cc(Nc4ccccc4)ccc3c2O)c(C)cc1N=Nc1ccc(N=Nc2c(C)cc(N=Nc3ccc(S(=O)(=O)O)cc3S(=O)(=O)O)cc2C)c(C)c1]
(36)
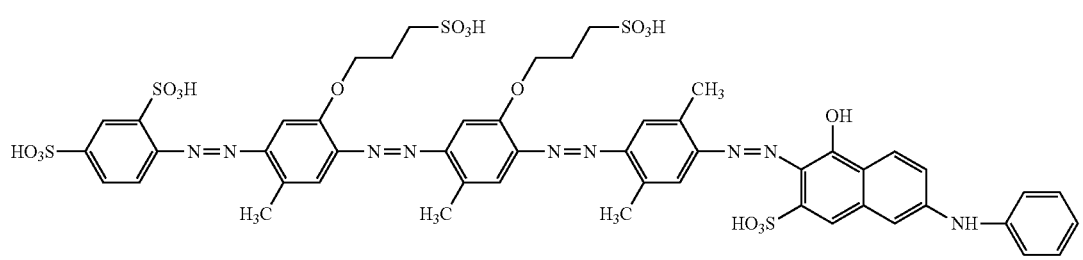 [SMILES: Cc1cc(N=Nc2c(S(=O)(=O)O)cc3cc(Nc4ccccc4)ccc3c2O)c(C)cc1N=Nc1cc(C)c(N=Nc2cc(C)c(N=Nc3ccc(S(=O)(=O)O)cc3S(=O)(=O)O)cc2OCCCS(=O)(=O)O)cc1OCCCS(=O)(=O)O]
(37)
TABLE E
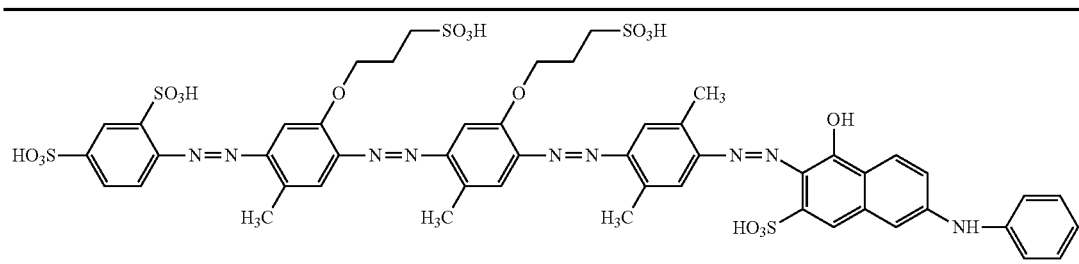
(38)
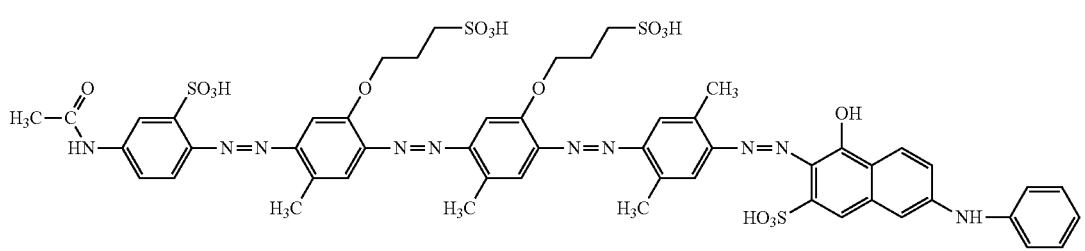 [SMILES: CC(=O)Nc1ccc(N=Nc2cc(OCCCS(=O)(=O)O)c(N=Nc3cc(OCCCS(=O)(=O)O)c(N=Nc4cc(C)c(N=Nc5c(S(=O)(=O)O)cc6cc(Nc7ccccc7)ccc6c5O)cc4C)cc3C)cc2C)c(S(=O)(=O)O)c1]
(39)

TABLE E-continued
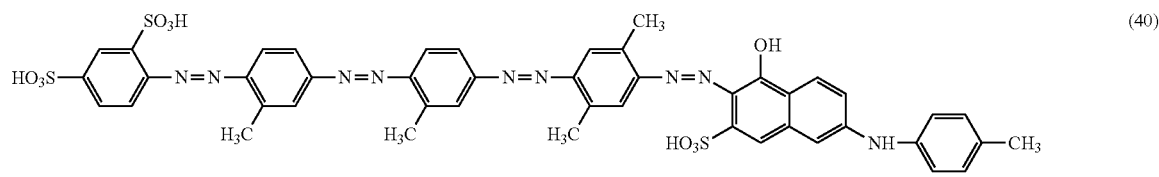
(40)
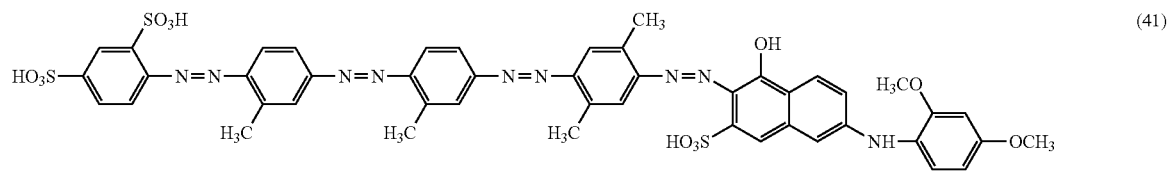
(41)
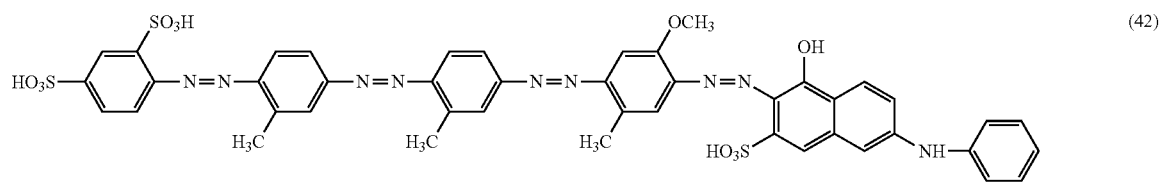
(42)
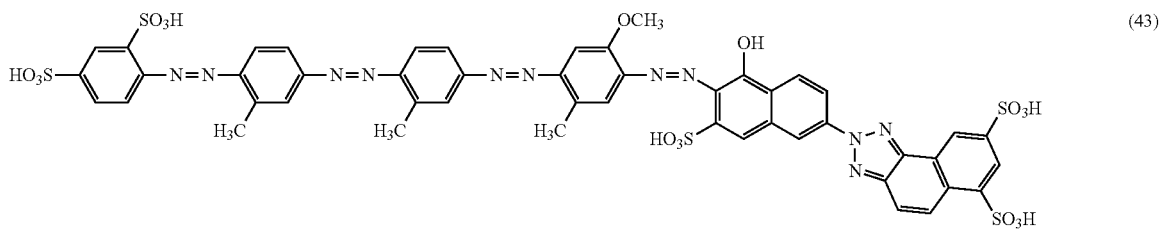
(43)
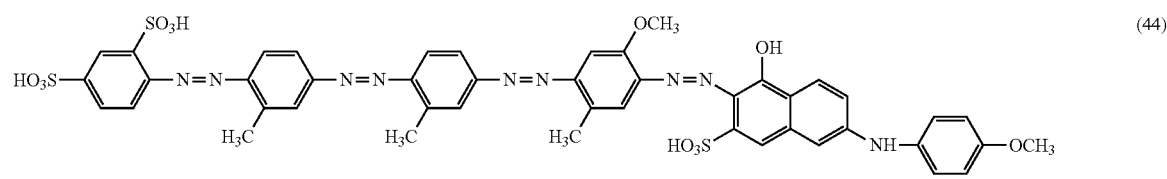
(44)
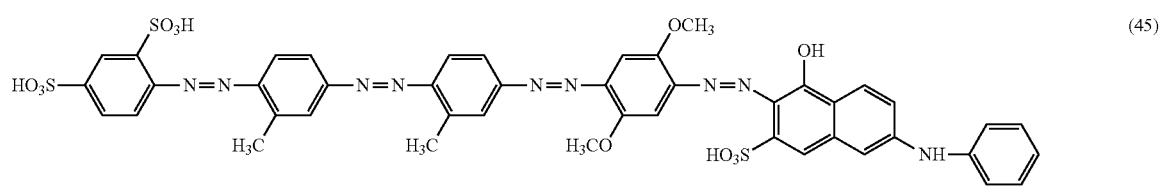
(45)
TABLE F
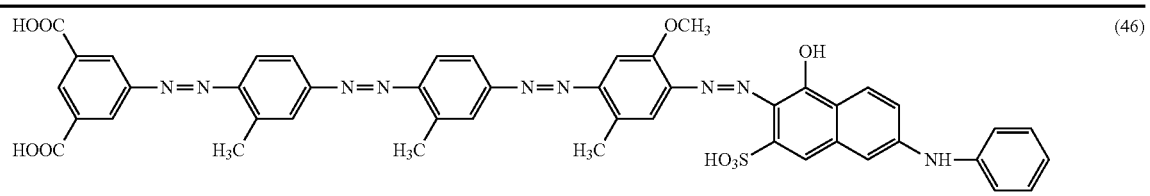
(46)
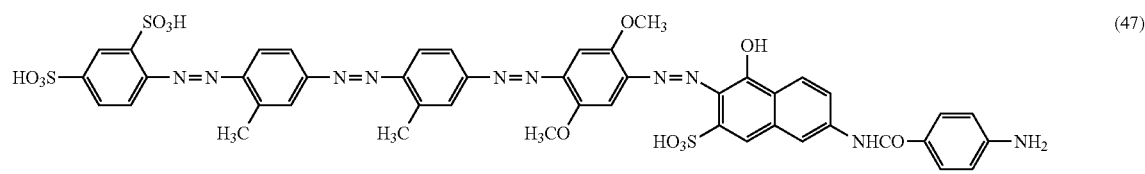
(47)

TABLE F-continued
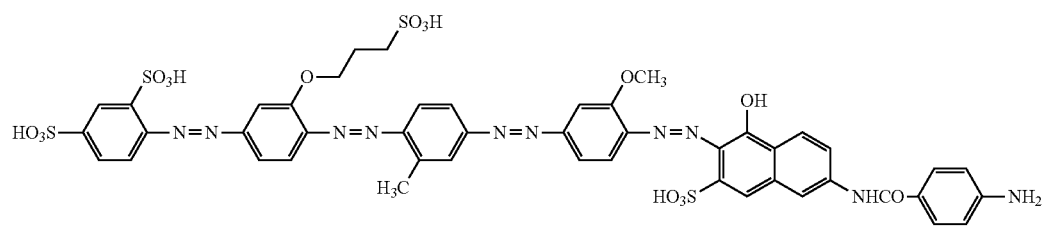 (48)
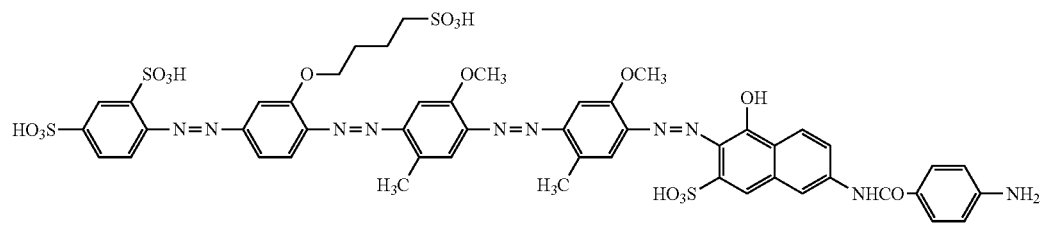 (49)
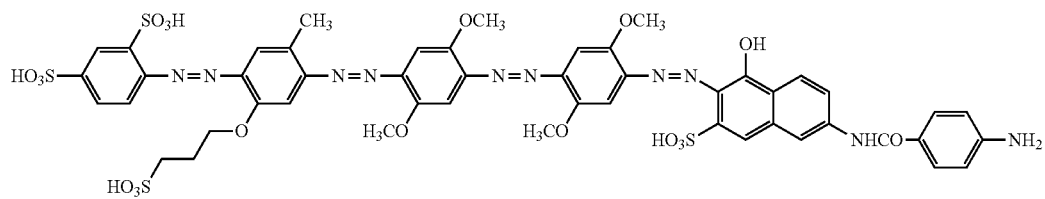 (50)
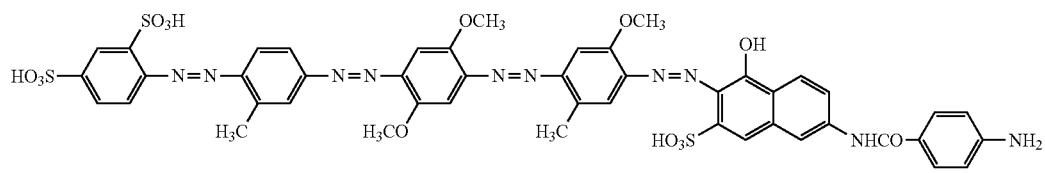 (51)
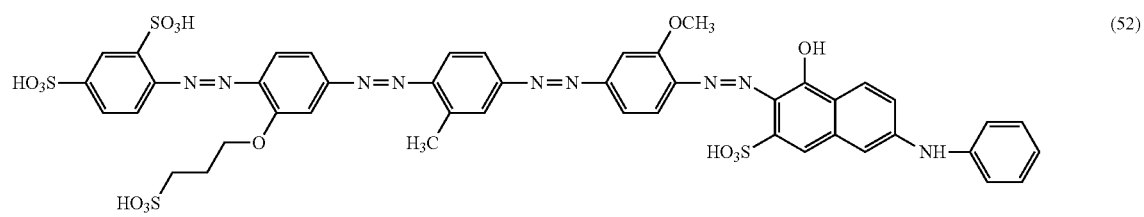 (52)
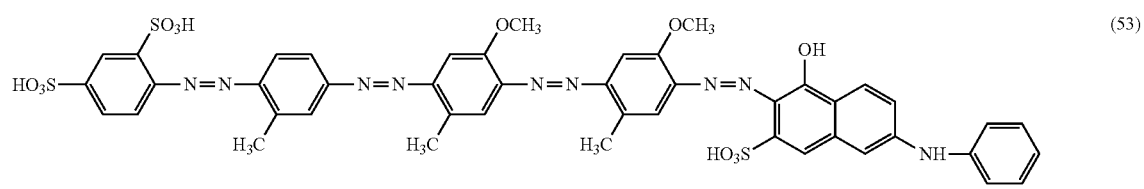 (53)
TABLE G
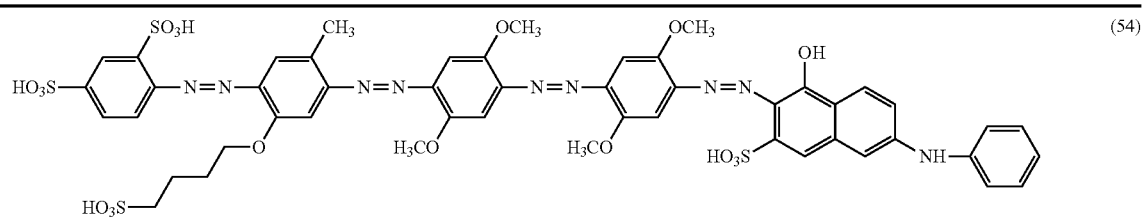 (54)

TABLE G-continued
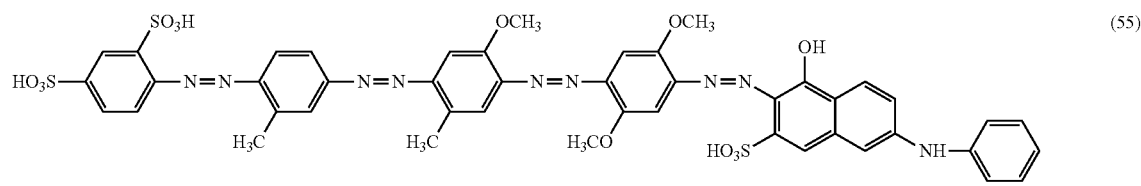
(55)
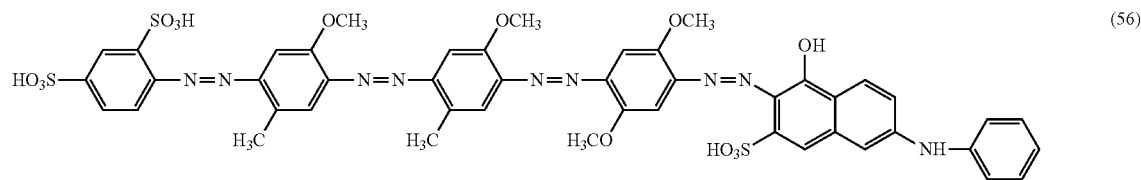
(56)
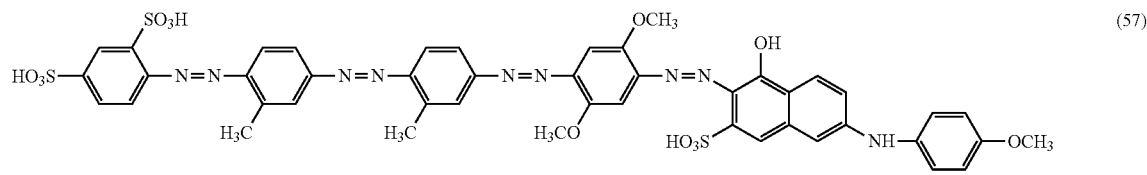
(57)
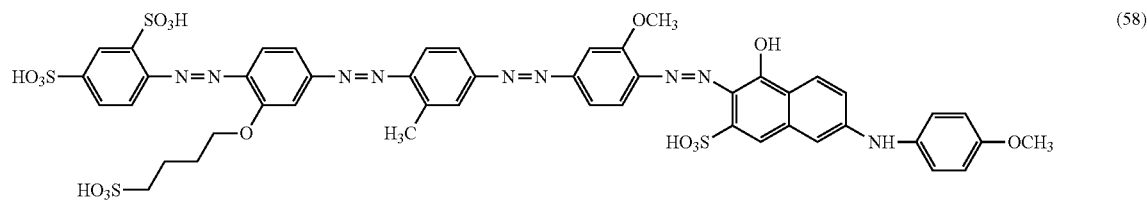
(58)
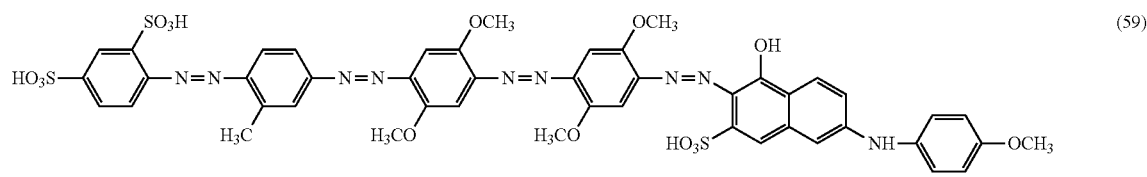
(59)
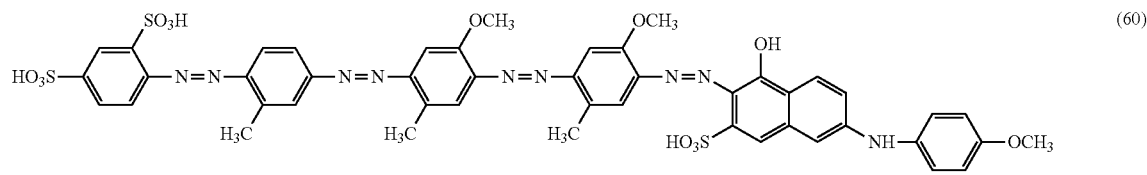
(60)
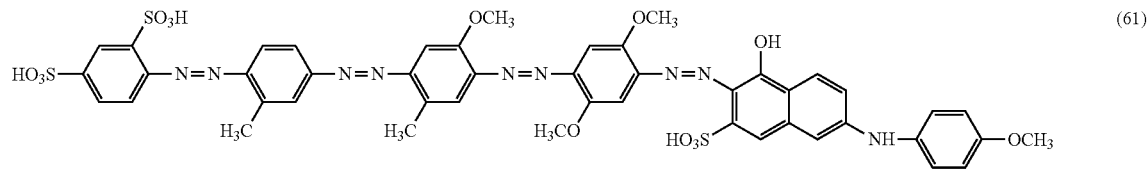
(61)
TABLE H
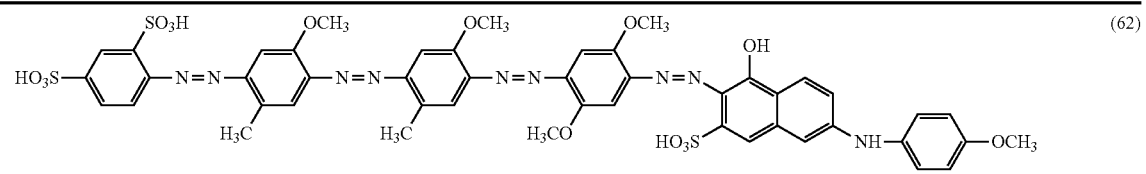
(62)

TABLE H-continued
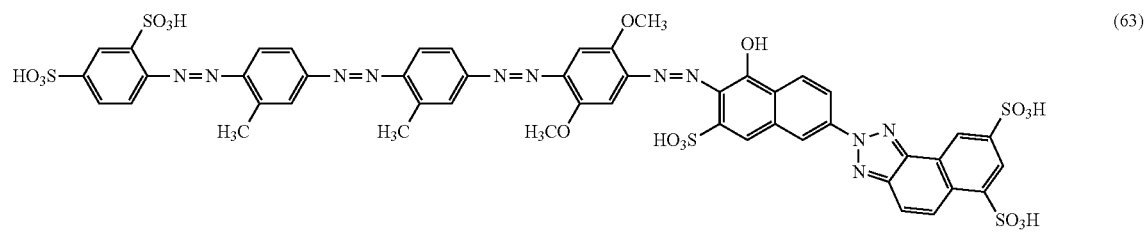
(63)
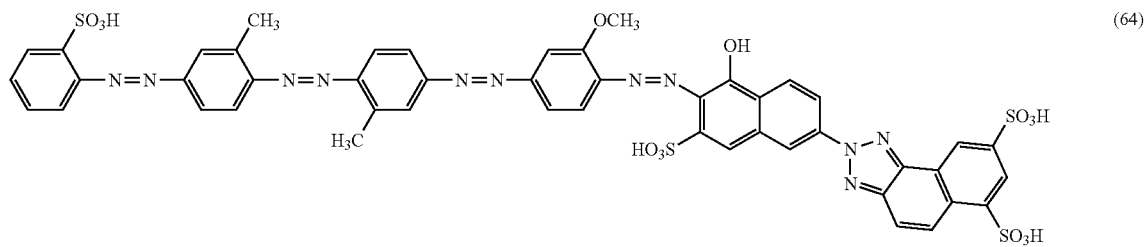
(64)
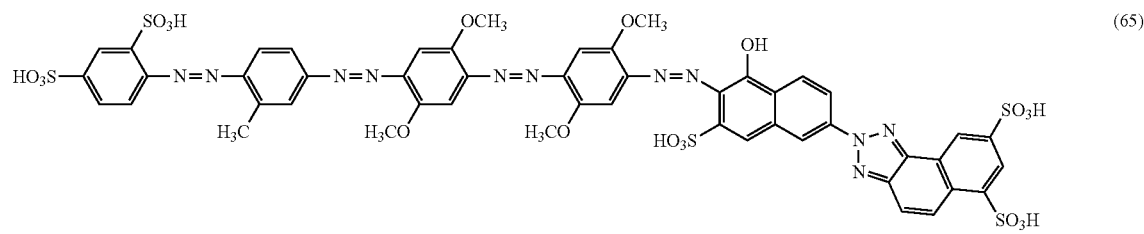
(65)
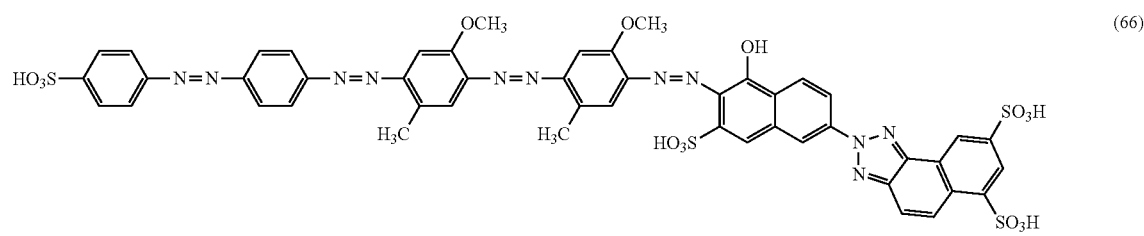
(66)
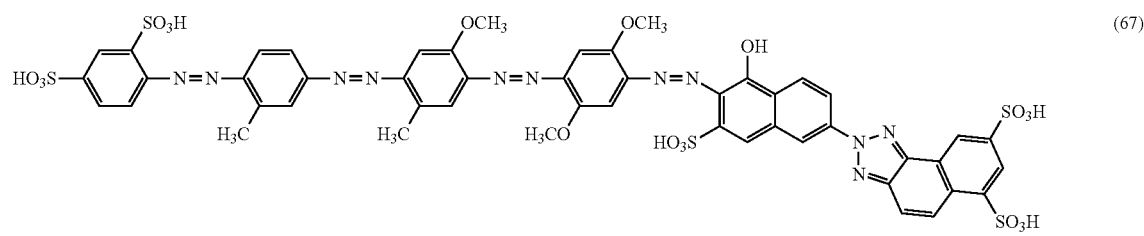
(67)
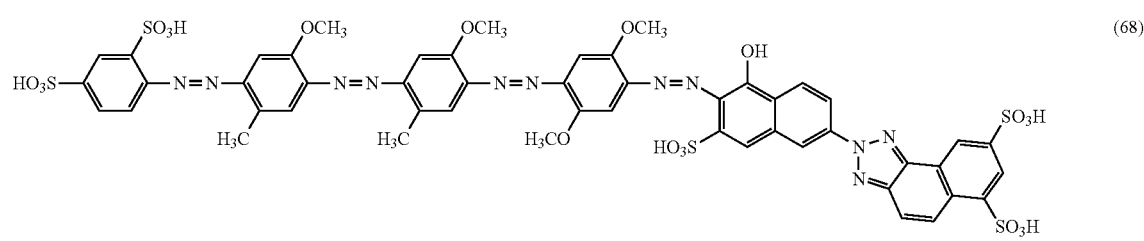
(68)

The azo compound represented by the above formula (1) and a salt thereof can be easily manufactured by known diazotization and coupling in accordance with a usual azo dye-manufacturing method as described in Non-Patent Literature 1.

In a specific manufacturing method, an aromatic amine (A-NH$_2$: A is the same as in the general formula (1)) corresponding to A group in the above formula (1) is diazotized, followed by primary coupling with an aniline of the following formula (A) to obtain a monoazoamino compound represented by the following formula (B).

Formula A

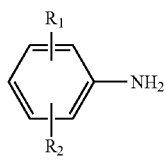

(A)

In the formula, R$_1$ and R$_2$ have the same meanings as in the above formula (1).

Formula (B)

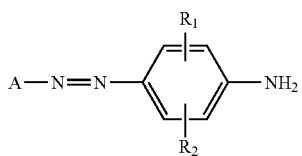

(B)

In the formula, A, R$_1$ and R$_2$ have the same meanings as in the above formula (1).

Subsequently, this monoazoamino compound (B) is diazotized, followed by secondary coupling with an aniline of the following formula (C) to obtain a disazoamino compound represented by the following formula (D).

Formula (C)

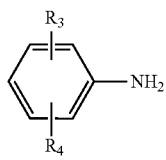

(C)

In the formula, R$_3$ and R$_4$ have the same meanings as in the above formula (1).

Formula (D)

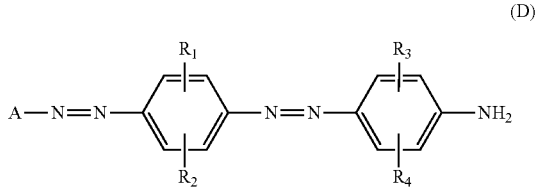

(D)

In the formula, A, R$_1$ to R$_4$ have the same meanings as in the above formula (1).

This disazoamino compound is diazotized, followed by tertiary coupling with an aniline of the following formula (E) to obtain a trisazoamino compound represented by the following formula (F).

Formula (E)

(E)

In the formula, R$_5$ and R$_6$ have the same meanings as in the above formula (1).

Formula (F)

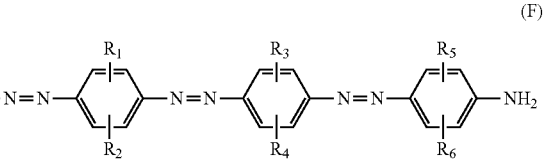

(F)

In the formula, A, R$_1$ to R$_6$ have the same meanings as in the above formula (1).

This trisazoamino compound is diazotized, followed by quaternary coupling with a naphthol represented by the following formula (G) to obtain an azo compound of the above formula (1).

Formula (G)

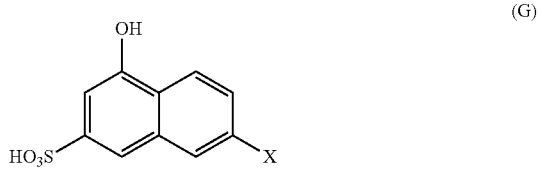

(G)

In the formula, X has the same meaning as in the above formula (1).

In the above-described reaction, diazotization process is carried out by a sequential method in which a diazo component is dissolved or suspended in an aqueous solution of a mineral acid such as hydrochloric acid and sulfuric acid and a nitrite salt such as sodium nitrite is added to the resulting mixed liquid for diazotization; or by a reverse method in which a nitrite salt is added to an aqueous solution of a neutral or weak alkaline diazo component and then a mineral acid is mixed therewith. The diazotization temperature is suitably −10 to 40° C. In addition, the coupling process with the above-described aniline is carried out by mixing an acidic aqueous solution containing an acid such as hydrochloric acid or acetic acid and an aniline, with the above-described each diazo liquid at a temperature of −10 to 40° C. under an acidic condition of pH 2 to 7.

The monoazo, disazo and trisazo compounds obtained by coupling can be used in next process, as they are, or after they are precipitated by aciding out or salting out and taken out by filtration, or as their solution or suspension. When the diazonium salt is insoluble and a suspension, it can also be filtered and used as a press cake in next coupling process.

In what follows, the groups represented by $R_1$ to $R_6$ and the like include a hydrogen atom, which is also explained as a "substituent" for convenience.

In the anilines each independently having any of $R_1$ to $R_6$ as a substituent, which are used the primary, secondary and tertiary couplings, the specific manufacturing method of anilines having a sulfo group-substituted alkoxy group are generally known. For example, a phenol can be sulfoalkylated and reduced by the manufacturing method described in Patent Literature 8, pp. 35 to give a sulfoalkoxyaniline. The resulting compound can be used in next coupling process.

The quaternary coupling reaction of a diazotized compound from a trisazoamino compound with a naphthol represented by the formula (G) is carried out at a temperature of −10 to 40° C. under a neutral to alkali condition of pH 7 to 10. After completion of the reaction, precipitation by salting out and then filtration are carried out to take out. And if purification is necessary, salting out may be repeated or precipitation out of the water may be carried out using an organic solvent. The organic solvent used for the purification includes, for example, water-soluble organic solvents such as alcohols such as methanol and ethanol and ketones such as acetone.

In this regard, the azo compound represented by the above formula (1) in the present invention is used as a free acid, and in addition, a salt of the azo compound can be used. Such a salt includes alkali metal salts such as lithium, sodium and potassium salts, an ammonium salt, and organic salts such as an amine salt. In general, a sodium salt is used.

The substituents for aromatic amines represented by A-NH$_2$ as a starting material for synthesis of an azo compound (water-soluble dye) represented by the above formula (1) include a sulfo group, a lower alkyl group, a lower alkoxy group, a lower alkoxy group having a sulfo group, a carboxy group, a substituted naphthotriazole group, a nitro group, an amino group, or a substituted amino group. It is preferably a sulfo group, a lower alkyl group and a lower alkoxy group. Preferably, at least one of its substituents is a sulfo group or a carboxy group, and more preferably, at least one thereof is a sulfo group. An aromatic amine corresponding to the above formula (6) having 2 substituents is further preferable. The lower alkoxy in the lower alkoxy group having a sulfo group is preferably a straight-chain and the substitution position of the sulfo group is preferably a terminal of said lower alkoxy group. Here, the lower alkoxy group preferably represents an alkoxy group having a carbon atom number of 1 to 5, and the lower alkoxy group having a sulfo group is preferably either a 3-sulfopropoxy group or a 4-sulfobutoxy group. When A is a phenyl group having a substituent, examples of the aromatic amine used as its raw material include, for example, 4-aminobenzenesulfonic acid, 3-aminobenzenesulfonic acid, 2-aminobenzenesulfonic acid, 4-aminobenzoic acid, 2-amino-5-methylbenzenesulfonic acid, 2-amino-5-methoxybenzenesulfonic acid, 4-amino-2-methylbenzenesulfonic acid, 3-amino-4-methoxybenzenesulfonic acid, 2-amino-4-sulfobenzoic acid, 2-amino-5-sulfobenzoic acid and the like, 5-aminoisophthalic acid, 2-amino-5-nitrobenzenesulfonic acid, 5-acetamide-2-aminobenzenesulfonic acid, 2-amino-5-(3-sulfopropoxy)benzenesulfonic acid, 4-aminobenzene-1, 3-disulfonic acid, 2-aminobenzene-1,4-disulfonic acid and the like. Among them, 4-aminobenzenesulfonic acid, 2-amino-5-methoxybenzenesulfonic acid, 4-amino-2-methylbenzenesulfonic acid and 4-aminobenzene-1,3-disulfonic acid are particularly preferable. In addition, A may have a naphthotriazole group (represented by the above formula (4)) as a substituent on the phenyl group. Examples thereof include a 6,8-disulfonaphthotriazole group, a 7,9-disulfonaphthotriazole group, a 7-sulfonaphthotriazole group, a 5-sulfonaphthotriazole group and the like. In this case, the substitution position is preferably the p-position of the phenyl group in A of the formula (1).

In an aniline having a substituent ($R_1$ to $R_6$) respectively corresponding to the formula (1) which are primary, secondary and tertiary coupling components, $R_1$ to $R_6$ include, as described above, a hydrogen atom, a lower alkyl group, a lower alkoxy group, or a lower alkoxy group having a sulfo group. They are preferably a hydrogen atom, a methyl group, a methoxy group, or a 3-sulfopropoxy group, a 4-sulfobutoxy group, and more preferably a hydrogen atom, a methyl group, a methoxy group, or a 3-sulfopropoxy group. The aniline having these substituents may have 1 or 2 substituents other than a hydrogen atom. When it has a substituent other than a hydrogen atom, the bond position is the 2-position, the 3-position, and the 2- and 5-positions, the 3- and 5-positions, or the 2- and 6-positions relative to the amino group, and the 3-position and the 2- and 5-positions are preferable. The aniline having a sulfo group-substituted lower alkoxy group includes 3-(2-amino-4-methylphenoxy)propane-1-sulfonic acid, 3-(2-aminophenoxy)propane-1-sulfonic acid, 3-(2-amino-4-methylphenoxy)butane-1-sulfonic acid and the like. An aniline having a substituent other than it includes, for example, aniline, 2-methylaniline, 3-methylaniline, 2-ethylaniline, 3-ethylaniline, 2,5-dimethylaniline, 2,5-diethylaniline, 2-methoxyaniline, 3-methoxyaniline, 2-methoxy-5-methylaniline, 2,5-dimethoxyaniline, 3,5-dimethylaniline, 2,6-dimethylaniline or 3,5-dimethoxyaniline and the like. The amino group in these anilines may be protected. The protecting group includes, for example, an omega-methanesulfone group. The anilines used for the primary coupling and the anilines used for the secondary and/or tertiary coupling may be the same or different.

X in naphthols (the formula (G)) having X as the quaternary coupling component is a phenylamino group which may have a substituent, a benzoylamino group which may have a substituent, a phenylazo group which may have a substituent or a naphthotriazole group which may have a substituent, and its substituent is preferably a lower alkyl group, a lower alkoxy group, a hydroxy group, a carboxy group, a sulfone group or an amino group or a substituted amino group, respectively. In this regard, the preferable group for X is as described above in the paragraph explaining the formula (1).

The naphthols represented by the above formula (G) include 6-phenylamino-1-naphthol-3-sulfonic acid, naphthols represented by the formula (72) described later, 6-(4'-methoxy phenylamino)-1-naphthol-3-sulfonic acid, 6-phenylamino-1-naphthol-3-sulfonic acid, 6-(4'-amino-3'-sulfophenylamino)-1-naphthol-3-sulfonic acid and the like.

In the dye-based polarizing film or the dye-based polarizing plate of the present invention, azo compounds represented by the above formula (1) and salts thereof are used alone or in combination, and in addition, one kind or more of other organic dyes may be used in combination according to necessity. The other organic dyes to be used in combination are not limited but preferably a dye having absorption characteristics in a wavelength region different from the absorption wavelength region of the azo compound or a salt thereof of the present invention and having high dichroism. Its typical examples include, for example, C.I. Direct Yellow 12, C.I. Direct Yellow 28, C.I. Direct Yellow 44, C.I. Direct Orange 26, C.I. Direct Orange 39, C.I. Direct Orange 71, C.I. Direct Orange 107, C.I. Direct Red 2, C.I. Direct Red 31, C.I. Direct Red 79, C.I. Direct Red 81, C.I. Direct Red 247, C.I. Direct Green 80, C.I. Direct Green 59, dyes described in Patent Literatures 1 to 7, and the like. According to the purpose, it is more preferable to use dyes developed for polarizing plates described in Patent Literatures 1 to 7 and the like. These coloring matters are used as a free acid or an alkali metal salt (for example, Na salt, K salt, Li salt), an ammonium salt, a salt of an amine.

According to necessity, when other organic dyes are used in combination, the kinds of dyes respectively mixed vary depending on that the desired polarizing film is a neutral-color polarizing film, a color polarizing film for a liquid crystal projector or another color polarizing film. The mixing ratio is not particularly limited but generally it is preferred that the total amount of at least one kind or more of the above other organic dyes used is in the range of 0.1 to 10 parts by mass on the basis of the mass of the azo compound of the above formula (1) and a salt thereof.

By allowing the azo compound represented by the formula (1) and a salt thereof to be contained in a polarizing raw film (for example, polymer film), together with another dye according to necessity, followed by orientation in a known method; or by mixing them with a liquid crystal, followed by orientation; or by orientation in an coating method, a polarizing film having a different color or a neutral color can be manufactured. A transparent protective film (or/and transparent protective layer) is attached to at least one of the surfaces of the obtained polarizing film to give a polarizing plate. In addition, the polarizing plate obtained above is provided with a transparent protective or AR (antireflection) layer, a support and the like according to necessity and used for a liquid crystal projector, an electronic calculator, a clock, a notebook personal computer, a word processor, a liquid crystal television, a car navigation system, a measurement instrument, an indicator and the like for indoor and outdoor, a lens and glasses.

The polarizing raw film (polymer film) used for the dye-based polarizing film of the present invention is preferably a film comprising a polyvinyl alcohol resin or a derivative thereof and specific examples thereof include polyvinyl alcohol given by saponification of polyvinyl acetate; or a vinyl alcohol copolymer (preferably containing 50% or more of a vinyl alcohol component) given by saponification of a copolymer of vinyl acetate and another copolymerizable monomer, for example, C2-C3 olefin such as ethylene and propylene and C3-C4 unsaturated carboxylic acid such as crotonic acid, acrylic acid, methacrylic acid and maleic acid; polyvinyl formal or polyvinyl acetal given by modification of polyvinyl alcohol with formaldehyde or acetaldehyde; and the like. Among them, a polyvinyl alcohol film is suitably used in terms of dye adsorptivity and orientation properties. The base thickness is usually 30 to 100 μm and preferably around 50 to 80 μm.

In allowing the azo compound of the above formula (1) or/and a salt thereof to be contained in such a polarizing raw film (polymer film), a method of dyeing a polymer film is usually employed. The dyeing is, for example, carried out as follows. First, the azo compound or/and a salt thereof of the present invention and, if necessary, a dye other than this are dissolved in water to prepare a dye bath. The dye concentration in the dye bath is not particularly limited but usually selected in the range of around 0.001 to 10% by mass. In addition, a dyeing auxiliary agent may be used if necessary, and for example, it is suitable to use a sodium sulfate in a concentration of around 0.1 to 10% by mass. A polymer film is immersed in the thus-prepared dye bath for 1 to 10 minutes for dyeing. The dyeing temperature is preferably around 40 to 80° C.

Orientation of the azo compound of the above formula (1) and a salt thereof is carried out by stretching the polymer film dyed as described above or by dyeing a stretched polymer film as described above. As the method of stretching, any known method may be used, for example, a wet method, a dry method or the like. Stretching of the polymer film may be carried out before dyeing in some cases. In this case, orientation of a water-soluble dye is carried out during dyeing. The polymer film with the water-soluble dye allowed to be contained and orientated is, according to necessity, subjected to after-treatment such as boric acid treatment by a known method. Such an after-treatment is carried out for the purpose of improving the light ray transmittance and the degree of polarization of the polarizing film. The conditions of boric acid treatment vary depending on the kind of the polymer film used and the kind of the dye used. In general, the boric acid concentration of the aqueous boric acid solution is in the range of 0.1 to 15% by mass and preferably 1 to 10% by mass, and treatment is carried out by immersion at a temperature in the range of 30 to 80° C. and preferably 40 to 75° C. for 0.5 to 10 minutes. Further according to necessity, fixing treatment may be simultaneously carried out with an aqueous solution containing a cation-based polymer compound.

To one or both surfaces of the thus-obtained dye-based polarizing film of the present invention, a transparent protective film excellent in optical transparency and mechanical strength is attached to give a polarizing plate. As a material forming a protective film, for example, a cellulose acetate-based film and an acrylic-based film, and in addition, a fluorine-based film such as an ethylene tetrafluoride/propylene hexafluoride-based copolymer, a resin film comprising a polyester resin, a polyolefin resin or a polyamide-based resin, and the like are used. Preferably, a triacetyl cellulose (TAC) film or a cycloolefin-based film is used. The thickness of the protective film is usually 40 to 200 μm.

The adhesive used for attaching the polarizing film and a transparent protective film includes a polyvinyl alcohol-based adhesive, a urethane emulsion-based adhesive, an acrylic-based adhesive, a polyester-isocyanate-based adhesive and the like and is suitably a polyvinyl alcohol-based adhesive.

On a surface of the dye-based polarizing plate of the present invention, a transparent protective layer may be further provided. The protective layer includes, for example, an acrylic-based or polysiloxane-based hard coat layer, a urethane-based protective layer and the like. In addition, in order for more improvement of the single plate light transmittance, it is preferred to provide an AR layer on this protective layer. The AR layer can be formed, for example, by vapor deposition or sputtering treatment of a substance such as silicon dioxide, titanium oxide and the like, or by thin-coating of a fluorine-based substance. In this regard, the dye-based polarizing plate of the present invention can be used as an elliptical polarizing plate with a retardation plate being attached thereto.

The thus-configured dye-based polarizing plate of the present invention has characteristics of less color-leakage in the orthogonal position in the visible light wavelength region, being excellent in polarization performance, and further, causing no discoloration or reduction in polarization performance even in the state of high temperature and high humidity and less light-leakage in the orthogonal position in the visible light region.

In addition, the dye-based polarizing plate of the present invention preferably has a single plate average light transmittance (in a wavelength region of 380 to 700 nm, or a certain wavelength region in a color polarizing plate) of 38% or more, preferably 39% or more, more preferably 40% or more and further preferably 41% or more, and an average light transmittance in the orthogonal position of 0.4% or less, preferably 0.3% or less, more preferably 0.2% or less, further preferably 0.1% or less.

When a polarizing plate having a hue of a neutral color such as neutral gray is formed from the dye-based polarizing plate of the present invention, a plurality (for example, 2 to 4 kinds) of other dichroism dyes having an absorption maximum in a different wavelength region are adsorbed into a polarizing raw film and oriented together with an azo compound represented by the formula (1) by a common method so that a polarizing film to be obtained shows a neutral color to obtain a polarizing film having a neutral color hue, which is then formed into a polarizing plate as described above.

Further, when forming a color polarizing plate, an azo compound of the formula (1) of the present invention is used alone, or according to necessity, in combination appropriately with another dichroism organic dye so as to have a desired hue corresponding to a desired color, for example, blue, green, red and the like, and they are adsorbed into a polarizing raw film and oriented to give a color polarizing film, which is then formed into a polarizing plate by a common method to obtain a color polarizing plate having a desired hue.

A preferable polarizing plate containing the azo compound of the formula (1) of the present invention has a high polarization ratio of 99.9% or more and also a high contrast value of 100 or more, preferably 190 or more, more preferably 300 or more and further preferably 400 or more, and therefore can be suitably used for various liquid crystal displays. Furthermore, the polarizing plate of the present invention has excellent durability and therefore can be suitably used also for liquid crystal displays to be used under severe conditions (liquid crystal displays, liquid crystal projectors and the like to be used in the open air).

In the present invention, a color polarizing plate, preferably a color polarizing plate for a liquid crystal projector, contains an azo compound represented by the above formula (1) and a salt thereof as a dichroic coloring matter, further according to necessity, together with another organic dye described above. In addition, the polarizing film of the present invention used for a color polarizing plate for a liquid crystal projector is also manufactured by the method described in the above section for the manufacturing method of the dye-based polarizing film of the present invention, and a protective film is further attached to give a polarizing plate, and according to necessity, a protective layer or an AR layer, a support and the like are provided for using as a color polarizing plate for a liquid crystal projector.

The color polarizing plate for a liquid crystal projector has a single plate average light transmittance of 39% or more and an average light transmittance of 0.4% or less in the orthogonal position in a required wavelength region of said polarizing plate (A. in the case of using an extra-high pressure mercury lamp: 420 to 500 nm for blue channel, 500 to 580 nm for green channel and 600 to 680 nm for red channel; and B. peak wavelength in the case of using a three-primary-color LED lamp: 430 to 450 nm for blue channel, 520 to 535 nm for green channel and 620 to 635 nm for red channel), and more preferably, in a required wavelength region of said polarizing plate, a single plate average light transmittance of 41% or more and an average light transmittance of 0.3% or less and more preferably 0.2% or less in the orthogonal position. Further preferably, in a required wavelength region of said polarizing plate, the single plate average light transmittance is 42% or more and the average light transmittance in the orthogonal position is 0.1% or less. The color polarizing plate for a liquid crystal projector of the present invention has brightness and excellent polarization performance as described above.

In this regard, the single plate average light transmittance is an average value of light ray transmittances in a certain wavelength region (380 to 700 nm in a neutral color and a certain wavelength region of a desired color in a color polarizing plate) when a natural light enters one polarizing plate provided with no support such as an AR layer and a transparent glass plate (hereinafter, when "polarizing plate" is referred for simplicity, it is used in the same meaning). The average light transmittance in the orthogonal position is an average value of light ray transmittances in a certain wavelength region when a natural light enters two polarizing plates where the orientation direction is arranged in the orthogonal position.

The liquid crystal display of the present invention has a structure in which a light exiting from a light source such as an extra-high pressure mercury lamp (UHP lamp), a metal halide lamp and a white LED goes through a liquid crystal to display an image on a screen for displaying, and the polarizing film or plate of the present invention may be arranged on either one or both of the light source side (the light-incident side) or the opposite side from the light source (the light-exit side) in relation to the liquid crystal on the way of light in the above-described liquid crystal display so that a light exiting from the light source passes through the placed polarizing film or plate of the present invention.

The color polarizing plate for a liquid crystal projector of the present invention is preferably a polarizing plate with the above AR layer, which is formed by providing a polarizing plate comprising a polarizing film and protective film with the AR layer, and more preferably a polarizing plate with an AR layer and a support, which is attached on a support such as a transparent glass plate.

The color polarizing plate for a liquid crystal projector of the present invention is usually used as a polarizing plate with a support. The support is preferably one having a planar part because the polarizing plate is attached thereto, and is preferably a transparent substrate because of optical application. The transparent substrate includes a glass plate, a lens, a prism (for example, a triangular prism and a cubic prism) and the like. A lens with the polarizing plate being attached can be used as a condenser lens with a polarizing plate in a liquid crystal projector. In addition, a prism with the polarizing plate attached can be used as a polarization beam splitter with a polarizing plate or a dichroic prism with a polarizing plate in a liquid crystal projector. Further, the polarizing plate may be attached to a liquid crystal cell. The main types of the transparent substrate are the inorganic substrate and the organic substrate and it includes inorganic substrates such as a soda glass, a borosilicate glass, a quartz substrate, a sapphire substrate and a spinel substrate and organic substrates such as acryl and polycarbonate, and an inorganic substrate is preferable. The thickness and size of the transparent substrate may be a desired size. Furthermore, it is preferred that the polarizing plate with a transparent substrate is provided with an AR layer on either one or both of the glass surface or the polarizing plate surface in order for more improvement of the single plate light transmittance.

In order to manufacture a color polarizing plate with a support for a liquid crystal projector, for example, a transparent adhesive (sticking agent) is coated on a support planar part, and then the dye-based polarizing plate of the present invention may be attached on this coated surface. Or, a transparent adhesive (sticking agent) is coated on a polarizing plate, and then on this coated surface, a support may be attached. The adhesive (sticking agent) used here is preferably, for example, an acrylic acid ester-based one. In this regard, when this polarizing plate is used as an elliptical polarizing plate, the retardation plate side is usually attached on the support side but also the polarizing plate side may be attached to the transparent substrate.

That is, in the color liquid crystal projector using the dye-based polarizing plate of the present invention, the dye-based polarizing plate of the present invention is arranged on either or both of the incident side or the exit side of the liquid crystal cell. Said polarizing plate may or may not be contacted with the liquid crystal cell, but is preferably not contacted from the viewpoint of durability. When the polarizing plate is contacted with the liquid crystal cell on the exit side, the dye-based polarizing plate of the present invention with a liquid crystal cell as a support can be used. When the polarizing plate is not contacted with the liquid crystal cell, it is preferred to use the dye-based polarizing plate of the present invention using a support other than a liquid crystal cell. In addition, from the viewpoint of durability, it is preferred to arrange the dye-based polarizing plate of the present invention on both the incident side and the exit side of the liquid crystal cell, and further it is preferred to arrange the polarizing plate surface of the dye-based polarizing plate of the present invention on the liquid crystal cell side and to arrange the support surface on the light source side. In this regard, the incident side of the liquid crystal cell refers to the light source side and the opposite side refers to the exit side.

The color liquid crystal projector using the dye-based polarizing plate of the present invention is preferably one with an ultraviolet-cut filter being arranged between a light source and a polarizing plate with a support on the above incident side. In addition, the liquid crystal cell to be used is preferably one which is, for example, an active matrix type and formed by enclosing a liquid crystal between a transparent substrate with an electrode and a TFT being formed and a transparent substrate with a counter electrode being formed.

A light emitted from a light source such as an extra-high pressure mercury lamp (UHP lamp), a metal halide lamp or a white LED is passed through an ultraviolet-cut filter and separated into three primary colors, which are then passed through a color polarizing plate with a support for each channel of blue, green and red, subsequently united and magnified by a projector lens to be projected on a screen. Otherwise, also known is the method in which, using each color LED of blue, green and red, a light emitted from each color LED is passed through a color polarizing plate with a support for each channel of blue, green and red, and then united and magnified by a projector lens to be projected on a screen.

The thus-configured color polarizing plate for a liquid crystal projector has characteristics of being excellent in polarization performance, and further, causing no discoloration or reduction in polarization performance even in the state of high temperature and high humidity.

EXAMPLES

Hereinafter, the present invention will be more specifically explained with reference to Examples but these are illustrative and do not limit the present invention. "%" and "part(s)" described below are based on mass unless otherwise particularly noted.

Example 1

To 500 parts of water, 25.3 parts of 4-aminobenzene-1,3-disulfonic acid were added, the mixture was cooled, and 31.3 parts of 35% hydrochloric acid were added at 10° C. or less. Next thereto, 6.9 parts of sodium nitrite were added, and the mixture was stirred at 5 to 10° C. for 1 hour for diazotization. Thereto, 10.7 parts of 3-methylaniline dissolved in dilute hydrochloric acid water were added, and while stirring at 10 to 30° C., sodium carbonate was added to adjust to pH 3, followed by further stirring to complete the coupling reaction. By filtration, 29.7 parts of a monoazoamino compound represented by the following formula (69) were obtained.

Formula (69)

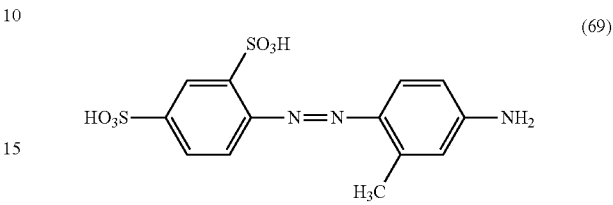

The obtained monoazoamino compound was added to 400 parts of water and the mixture was dissolved with sodium hydroxide. At 10 to 30° C., thereto, 25.0 parts of 35% hydrochloric acid were added and next, 5.5 parts of sodium nitrite were added. The resulting mixed liquid was stirred at 20 to 30° C. for 1 hour for diazotization. Thereto, 8.6 parts of 3-methylaniline dissolved in dilute hydrochloric acid water were added, and while stirring at 20 to 30° C., sodium carbonate was added to adjust to pH 3, followed by further stirring to complete the coupling reaction. By filtration, 31.3 parts of a disazoamino compound represented by the following formula (70) were obtained.

Formula (70)

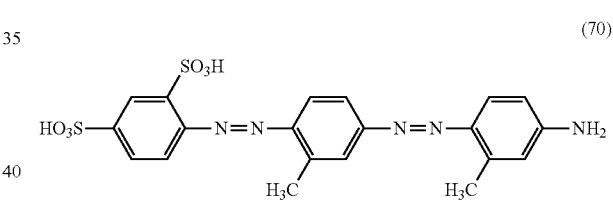

The obtained disazoamino compound was added to 250 parts of water and the mixture was dissolved with sodium hydroxide. At 20 to 30° C., thereto, 20.0 parts of 35% hydrochloric acid were added and next, 4.4 parts of sodium nitrite were added. It was stirred at 20 to 30° C. for 1 hour for diazotization. Thereto, 7.7 parts of 2,5-dimethylaniline dissolved in dilute hydrochloric acid water were added, and while stirring at 20 to 30° C., sodium carbonate was added to adjust to pH 3.5. The mixture was further stirred to complete the coupling reaction. By filtration, 31.8 parts of a trisazoamino compound represented by the following formula (71) were obtained.

Formula (71)

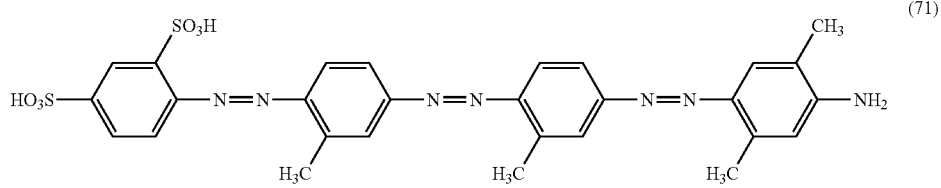

The obtained trisazoamino compound was added to 200 parts of water and the mixture was dissolved with sodium hydroxide. At 20 to 30° C., thereto, 16.0 parts of 35% hydrochloric acid were added, next, 3.5 parts of sodium nitrite were added, and the mixture was stirred at 20 to 30° C. for 1 hour for diazotization. Meanwhile, 16.1 parts of 6-phenylamino-1-naphthol-3-sulfonic acid as a quaternary coupler were added to 50 parts of water and the mixture was dissolved with sodium carbonate to be weak alkaline. Into this liquid, a diazotized compound of the former-obtained trisazoamino compound was poured with the pH 8 to 10 being kept, and the mixture was stirred to complete the coupling reaction. Salting out was conducted with sodium chloride, subsequently followed by filtration to obtain 24.3 parts of a tetrakisazo compound represented by the above formula (17). The maximum absorption wavelength of this compound in a 20% aqueous pyridine solution was 576 nm.

Example 2

In the same manner as in Example 1 except that 17.7 parts of 6-(4'-methoxy phenylamino)-1-naphthol-3-sulfonic acid were used instead of 16.1 parts of 6-phenylamino-1-naphthol-3-sulfonic acid as a quaternary coupler, 25.0 parts of a tetrakisazo compound represented by the above formula (16) were obtained. The maximum absorption wavelength of this compound in a 20% aqueous pyridine solution was 579 nm.

Example 3

In the same manner as in Example 1 except that 18.3 parts of 6-(4'-aminobenzoylamino)-1-naphthol-3-sulfonic acid were used instead of 16.1 parts of 6-phenylamino-1-naphthol-3-sulfonic acid as a quaternary coupler, 25.4 parts of a tetrakisazo compound represented by the above formula (21) were obtained. The maximum absorption wavelength of this compound in a 20% aqueous pyridine solution was 559 nm.

Example 4

In the same manner as in Example 1 except that 28.2 parts of a naphthol represented by the following formula (72) were used instead of 16.1 parts of 6-phenylamino-1-naphthol-3-sulfonic acid as a quaternary coupler, 30.3 parts of a tetrakisazo compound represented by the above formula (20) were obtained. The maximum absorption wavelength of this compound in a 20% aqueous pyridine solution was 575 nm.

Formula (72)

(72)

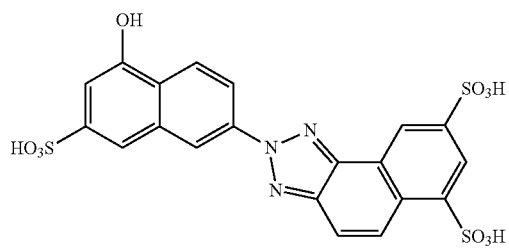

Example 5

To 500 parts of water, 25.3 parts of 4-aminobenzene-1,3-disulfonic acid were added and the mixture was cooled. At 10° C. or less, thereto, 31.3 parts of 35% hydrochloric acid were added, next, 6.9 parts of sodium nitrite were added, and the mixture was stirred at 5 to 10° C. for 1 hour for diazotization. Thereto, 24.5 parts of 3-(2-amino-4-methylphenoxy)propane-1-sulfonic acid dissolved in dilute hydrochloric acid water were added, and while stirring the mixture at 10 to 30° C., sodium carbonate was added to adjust to pH 3. Further stirring was conducted to complete the coupling reaction. By conducting separation by filtration, 40.7 parts of a monoazoamino compound represented by the following formula (73) were obtained.

Formula (73)

(73)

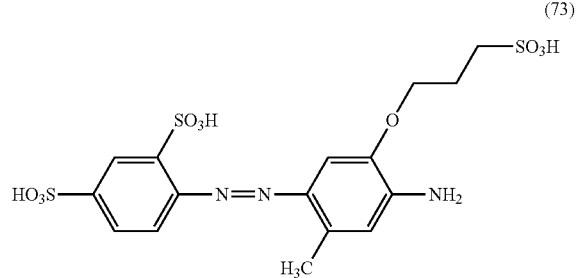

The obtained monoazoamino compound was added to 400 parts of water, the mixture was dissolved with sodium hydroxide, and at 10 to 30° C., 25.0 parts of 35% hydrochloric acid and next 5.5 parts of sodium nitrite were added, followed by stirring at 20 to 30° C. for 1 hour for diazotization. Thereto, 9.7 parts of 2,5-dimethylaniline (secondary coupler) dissolved in dilute hydrochloric acid water were added, and while stirring at 20 to 30° C., sodium carbonate was added to adjust to pH 3, followed by further stirring to complete the coupling reaction and by filtration to obtain 41.0 parts of a disazoamino compound represented by the following formula (74).

Formula (74)

(74)

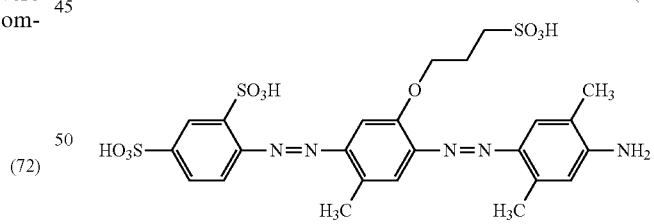

The obtained disazoamino compound was added to 250 parts of water, and the mixture was dissolved with sodium hydroxide. At 20 to 30° C., thereto, 20.0 parts of 35% hydrochloric acid were added and next, 4.4 parts of sodium nitrite were added. It was stirred at 20 to 30° C. for 1 hour for diazotization. Thereto, 7.7 parts of 2,5-dimethylaniline dissolved in dilute hydrochloric acid water were added, and while stirring at 20 to 30° C., sodium carbonate was added to adjust to pH 3.5. Further stirring was conducted to complete the coupling reaction. By conducting separation by filtration, 39.6 parts of a trisazoamino compound represented by the following formula (75) were obtained.

Formula (75)

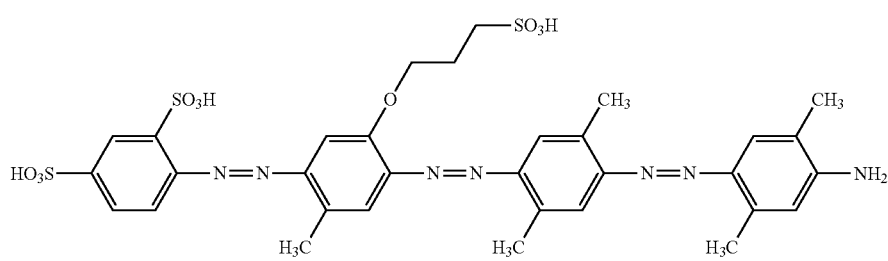

The obtained trisazoamino compound was added to 200 parts of water, and the mixture was dissolved with sodium hydroxide. At 20 to 30° C., thereto, 16.0 parts of 35% hydrochloric acid were added and next, 3.5 parts of sodium nitrite were added. The mixture was stirred at 20 to 30° C. for 1 hour for diazotization. Meanwhile, 17.7 parts of 6-(4'-methoxy phenylamino)-1-naphthol-3-sulfonic acid as a quaternary coupler were added to 50 parts of water, and the mixture was dissolved with sodium carbonate to be weak alkaline. Into this liquid, a liquid containing a diazotized compound of the former-obtained trisazoamino compound was poured with pH 8 to 10 being kept, followed by stirring to complete the coupling reaction. Salting out was conducted with sodium chloride, followed by separation by filtration to obtain 28.9 parts of a tetrakisazo compound represented by the above formula (9). The maximum absorption wavelength of this compound in a 20% aqueous pyridine solution was 581 nm.

Example 6

In the same manner as in Example 5 except that 16.1 parts of 6-phenylamino-1-naphthol-3-sulfonic acid were used instead of 17.7 parts of 6-(4'-methoxy phenylamino)-1-naphthol-3-sulfonic acid as a quaternary coupler, 28.2 parts of a tetrakisazo compound represented by the above formula (11) were obtained. The maximum absorption wavelength of this compound in a 20% aqueous pyridine solution was 578 nm.

Example 7

In the same manner as in Example 5 except that 21.0 parts of 6-(4'-amino-3'-sulfophenylamino)-1-naphthol-3-sulfonic acid were used instead of 17.7 parts of 6-(4'-methoxy phenylamino)-1-naphthol-3-sulfonic acid as a quaternary coupler, 30.6 parts of a tetrakisazo compound represented by the above formula (13) were obtained. The maximum absorption wavelength of this compound in a 20% aqueous pyridine solution was 585 nm.

Example 8

In the same manner as in Example 5 except that 18.3 parts of 6-(4'-aminobenzoylamino)-1-naphthol-3-sulfonic acid were used instead of 17.7 parts of 6-(4'-methoxy phenylamino)-1-naphthol-3-sulfonic acid as a quaternary coupler, 29.3 parts of a tetrakisazo compound represented by the above formula (14) were obtained. The maximum absorption wavelength of this compound in a 20% aqueous pyridine solution was 567 nm.

Example 9

In the same manner as in Example 5 except that 28.2 parts of a naphthol represented by the above formula (72) were used instead of 17.7 parts of 6-(4'-methoxy phenylamino)-1-naphthol-3-sulfonic acid as a quaternary coupler, 29.1 parts of a tetrakisazo compound represented by the above formula (15) were obtained. The maximum absorption wavelength of this compound in a 20% aqueous pyridine solution was 577 nm.

Example 10

In the same manner as in Example 5 except that 17.6 parts of 6-(4'-hydroxyphenylazo)-3-sulfo-1-naphthol were used instead of 17.7 parts of 6-(4'-methoxy phenylamino)-1-naphthol-3-sulfonic acid as a quaternary coupler, 28.9 parts of a tetrakisazo compound represented by the above formula (19) were obtained. The maximum absorption wavelength of this compound in a 20% aqueous pyridine solution was 601 nm.

Example 11

In the same manner as in Example 5 except that 8.6 parts of 3-methylaniline were used instead of 9.7 parts of 2,5-dimethylaniline as a secondary coupler, 28.6 parts of a tetrakisazo compound represented by the above formula (12) were obtained. The maximum absorption wavelength of this compound in a 20% aqueous pyridine solution was 581 nm.

Example 12

In the same manner as in Example 5 except that 19.6 parts of 3-(2-amino-4-methylphenoxy)propane-1-sulfonic acid were used instead of 9.7 parts of 2,5-dimethylaniline as a secondary coupler, 30.8 parts of a tetrakisazo compound represented by the above formula (8) were obtained. The maximum absorption wavelength of this compound in a 20% aqueous pyridine solution was 591 nm.

Example 13

In the same manner as in Example 5 except that 13.7 parts of 2-methoxy-5-methylaniline were used instead of 24.5 parts of 3-(2-amino-4-methylphenoxy)propane-1-sulfonic acid as a primary coupler, 26.2 parts of a tetrakisazo compound represented by the above formula (18) were obtained. The maximum absorption wavelength of this compound in a 20% aqueous pyridine solution was 581 nm.

Example 14

In the same manner as in Example 5 except that 12.1 parts of 2,5-dimethylaniline were used instead of 24.5 parts of 3-(2-amino-4-methylphenoxy)propane-1-sulfonic acid as a primary coupler and that 19.6 parts of 3-(2-amino-4-methylphenoxy)propane-1-sulfonic acid were used instead of 9.7 parts of 2,5-dimethylaniline as a secondary coupler, 28.9 parts of a tetrakisazo compound represented by the above formula (10) were obtained. The maximum absorption wavelength of this compound in a 20% aqueous pyridine solution was 588 nm.

Example 15

In the same manner as in Example 1 except that 8.7 parts of 2-methoxy-5-methylaniline were used instead of 7.7 parts of 2,5-dimethylaniline as a tertiary coupler, 24.7 parts of a tetrakisazo compound represented by the above formula (42) were obtained. The maximum absorption wavelength of this compound in a 20% aqueous pyridine solution was 591 nm.

Example 16

In the same manner as in Example 1 except that 8.7 parts of 2-methoxy-5-methylaniline were used instead of 7.7 parts of 2,5-dimethylaniline as a tertiary coupler and that 28.1 parts of a naphthol represented by the above formula (72) were used instead of 16.1 parts of 6-phenylamino-1-naphthol-3-sulfonic acid as a quaternary coupler, 30.7 parts of a tetrakisazo compound represented by the above formula (43) were obtained. The maximum absorption wavelength of this compound in a 20% aqueous pyridine solution was 589 nm.

Example 17

In the same manner as in Example 1 except that 8.7 parts of 2-methoxy-5-methylaniline were used instead of 7.7 parts of 2,5-dimethylaniline as a tertiary coupler and that 17.6 parts of 6-(4'-methoxy phenylamino)-1-naphthol-3-sulfonic acid were used instead of 16.1 parts of 6-phenylamino-1-naphthol-3-sulfonic acid as a quaternary coupler, 25.4 parts of a tetrakisazo compound represented by the above formula (44) were obtained. The maximum absorption wavelength of this compound in a 20% aqueous pyridine solution was 595 nm.

Example 18

In the same manner as in Example 1 except that 9.7 parts of 2,5-dimethoxyaniline were used instead of 7.7 parts of 2,5-dimethylaniline as a tertiary coupler, 25.1 parts of a tetrakisazo compound represented by the above formula (45) were obtained. The maximum absorption wavelength of this compound in a 20% aqueous pyridine solution was 607 nm.

Example 19

In an aqueous solution at 45° C. with a compound of the above formula (17) obtained Example 1 having a concentration of 0.03% and a sodium sulfate having a concentration of 0.1%, a polyvinyl alcohol having a thickness of 75 μm was immersed for 4 minutes. This film was stretched 5-fold in a 3% aqueous boric acid solution at 50° C., washed with water while keeping the tension state, and dried to obtain a polarizing film.

The obtained polarizing film had a maximum absorption wavelength of 579 nm and a polarization ratio of 99.9%, thus having a high polarization ratio. In this regard, the test method will be described below.

For measurement of the maximum absorption wavelength and calculation of the polarization ratio of each polarizing film, the parallel transmittance and the orthogonal transmittance at polarized-light incidence were measured and calculated using a spectrophotometer (U-4100 manufactured by Hitachi, Ltd.).

Here, the parallel transmittance (Ky) is a transmittance when the absorption axis of a polarizing film and the absorption axis of a polarizing film are parallel to each other, and the orthogonal transmittance (Kz) shows a transmittance when the absorption axis of a polarizing film and the absorption axis of a polarizing film are orthogonal to each other.

The parallel transmittance and the orthogonal transmittance of each wavelength were measured at intervals of 1 nm from 380 to 780 nm. Using each measured value, the polarization ratio of each wavelength was calculated in accordance with the following formula (i), and the highest polarization ratio from 380 to 780 nm and its maximum absorption wavelength (nm) were obtained.

$$\text{Polarization ratio (\%)} = [(Ky-Kz)/(Ky+Kz)] \times 100 \quad (i)$$

Examples 20 to 36

In the same manner as in Example 19 except that each azo compound according to Examples 2 to 18 was used instead of the compound of the above formula (17), each polarizing film of Examples 20 to 36 was obtained. The maximum absorption wavelength and the polarization ratio of the obtained each polarizing film are shown in Table 1.

As in Table 1, any of the polarizing films made using these compounds had a high polarization ratio.

TABLE 1

| Example | Azo compound and salt thereof | Maximum absorption wavelength (nm) | Polarization ratio (%) |
|---|---|---|---|
| 19 | Compound of the formula (17) | 579 | 99.9 |
| 20 | Compound of the formula (8) | 592 | 99.9 |
| 21 | Compound of the formula (9) | 588 | 99.9 |
| 22 | Compound of the formula (10) | 590 | 99.9 |
| 23 | Compound of the formula (11) | 579 | 99.9 |
| 24 | Compound of the formula (12) | 591 | 99.9 |
| 25 | Compound of the formula (13) | 584 | 99.9 |
| 26 | Compound of the formula (14) | 563 | 99.9 |
| 27 | Compound of the formula (15) | 571 | 99.9 |
| 28 | Compound of the formula (16) | 588 | 99.9 |
| 29 | Compound of the formula (18) | 588 | 99.9 |
| 30 | Compound of the formula (19) | 577 | 99.9 |
| 31 | Compound of the formula (20) | 564 | 99.9 |
| 32 | Compound of the formula (21) | 560 | 99.9 |
| 33 | Compound of the formula (42) | 593 | 99.9 |
| 34 | Compound of the formula (43) | 584 | 99.9 |
| 35 | Compound of the formula (44) | 610 | 99.9 |
| 36 | Compound of the formula (45) | 614 | 99.9 |

Example 37

One of the indexes indicating image quality is a contrast showing the difference between the luminance of white display and the luminance of black display. The maximum absorption wavelength of each polarizing film obtained in Examples 19 to 29 and 31 to 36 and each contrast obtained then are shown in Table 2.

Here, the contrast represents a ratio of parallel transmittance to orthogonal transmittance (contrast=parallel transmittance at maximum absorption wavelength (Ky)/orthogonal transmittance at maximum absorption wavelength (Kz)), indicating that larger this value is, more excellent the polarization performance of a polarizing plate is.

In this regard, for evaluation of the contrast (polarization performance), each sample was made so that each polarizing film has the same parallel transmittance at the maximum absorption wavelength, and comparison was conducted. As shown in Table 2, any of the polarizing films made using these compounds had a high contrast.

Comparative Example 1

Using a compound (II) of Patent Literature 5 (PTL 5) represented by the following formula:

PTL 5 Compound (11)

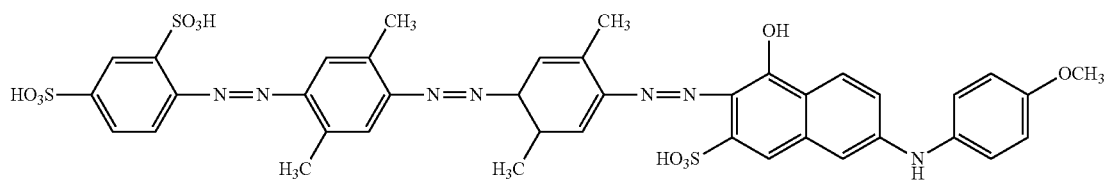

instead of the compound of Example 1, a polarizing film was made in the same manner as in Example 19 of the present invention and a contrast was calculated in the same manner as in Examples 19 to 29 and 31 to 36.

As shown In Table 2, any of the compounds of the present invention had a high contrast and excellent polarization performance, relative to Comparative Example 1.

In this regard, the above-described compound was synthesized in the same manner as in the example 7 of Patent Literature 5.

Comparative Example 2

Using a compound (4) of Patent Literature 6 (PTL 6) represented by the following formula:

PTL 6 Compound (4)

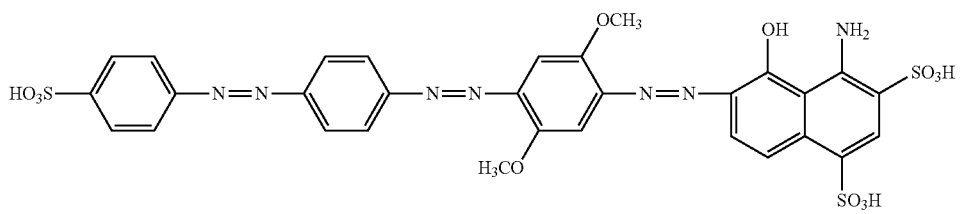

instead of the compound of Example 1, a polarizing film was made in the same manner as in Example 19 of the present invention and a contrast was calculated in the same manner as in Examples 19 to 29 and 31 to 36. As shown in Table 2, any of the compounds of the present invention had a high contrast and excellent polarization performance, relative to Comparative Example 2. In this regard, the above-described compound was synthesized in the same manner as in the example 2 of Patent Literature 6

Comparative Example 3

Using a compound (I-3):

PTL 7 Compound (I-3)

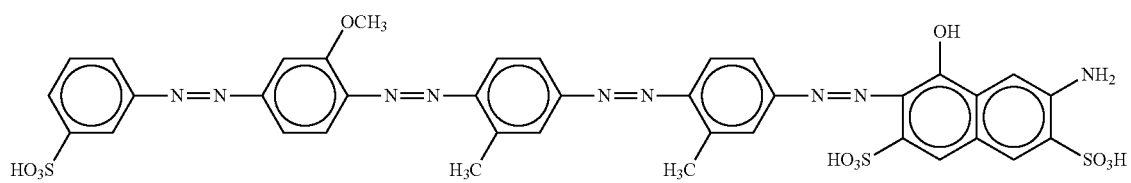

of Patent Literature 7 (PTL 7) instead of the compound of Example 1, a polarizing film was made in the same manner as in Example 19 of the present invention and a contrast was calculated in the same manner as in Examples 19 to 29 and 31 to 36. As shown in Table 2, any of the compounds of the present invention had a high contrast and excellent polarization performance, relative to Comparative Example 3.

In this regard, the above-described compound was synthesized in the same manner as described in p. 21, [0077] of Patent Literature 7.

TABLE 2

| Azo compound and a salt thereof | Maximum absorption wavelength (nm) | contrast |
| --- | --- | --- |
| Compound of the formula (17) | 579 | 547 |
| Compound of the formula (8) | 592 | 190 |
| Compound of the formula (9) | 588 | 207 |
| Compound of the formula (10) | 590 | 191 |
| Compound of the formula (11) | 579 | 350 |
| Compound of the formula (12) | 591 | 232 |
| Compound of the formula (13) | 584 | 205 |
| Compound of the formula (14) | 563 | 218 |
| Compound of the formula (15) | 571 | 300 |
| Compound of the formula (16) | 588 | 497 |
| Compound of the formula (18) | 588 | 195 |
| Compound of the formula (20) | 564 | 346 |
| Compound of the formula (21) | 560 | 230 |
| Compound of the formula (42) | 593 | 545 |
| Compound of the formula (43) | 584 | 212 |
| Compound of the formula (44) | 610 | 413 |
| Compound of the formula (45) | 614 | 450 |
| Compound of Comparative Example 1 | 586 | 64 |
| Compound of Comparative Example 2 | 664 | 79 |
| Compound of Comparative Example 3 | 590 | 67 |

Example 37

To the both surfaces of the polarizing film obtained in Example 25, a cellulose triacetate film (TAC film; manufactured by Fujifilm Corporation; trade name: TD-80U) was laminated via an adhesive of an aqueous polyvinyl alcohol solution, and using an sticking agent, the film was attached to a glass to make a polarizing plate with a support. This polarizing plate was light-irradiated for 190 hours by an accelerated xenon arc tester (manufactured by Suga Test Instruments Co., Ltd.; SX-75) and the polarization ratio change was measured before and after irradiation. The change ratio of the polarization ratio was calculated according to {(polarization ratio before irradiation)–polarization ratio after irradiation)}/(polarization ratio before irradiation), resulting in 0.08% showing excellent durability.

Examples 38 to 40, Comparative Examples 4 and 5

Using each polarizing film obtained in Examples 21, 22 and 24, a polarizing plate with a support was made in the same manner as in Example 37 (Examples 38 to 40). In addition, using each polarizing film obtained in Comparative Examples 1 and 2, a polarizing plate with a support was likewise made (Comparative Examples 4 and 5).

The obtained each polarizing plate was irradiated with light in the same manner as in Example 37 and the polarization ratio change in each polarizing plate was measured before and after light-irradiation. The results are shown in Table 3.

As is clear from Table 3, the polarizing plates of the present invention had a small change ratio of polarization ratio and showed remarkably excellent durability in comparison with Comparative Examples

TABLE 3

| Example | Polarizing film | Change ratio of polarization ratio (%) |
| --- | --- | --- |
| 37 | Polarizing film of Example 25 | 0.08 |
| 38 | Polarizing film of Example 21 | 0.60 |
| 39 | Polarizing film of Example 22 | 0.49 |
| 40 | Polarizing film of Example 24 | 0.53 |
| Comparative Example 4 | Compound of Comparative Example 1 | 1.80 |
| Comparative Example 5 | Compound of Comparative Example 2 | 1.38 |

Example 41

In the same manner as in Example 19 except that an aqueous solution of 45° C. with a dye of the compound (17) obtained Example 1 having a concentration of 0.2%, C.I. Direct Orange 39 having a concentration of 0.07%, C.I. Direct Red 81 having a concentration of 0.02% and a sodium sulfate having a concentration of 0.1% were used, a polarizing film was made. The obtained polarizing film had a maximum absorption wavelength of 555 nm, a single plate average light transmittance at 530 to 570 nm of 42% and an average light transmittance in the orthogonal position of 0.02%, thus having high degree of polarization.

On one surface of this polarizing film, a cellulose triacetate film (TAC film; manufactured by Fuji Photo Film Co., Ltd; trade name: TD-80U) was attached in the same manner as in Example 37, and on the other surface, a film with an about 10 μm ultraviolet curable hard coat layer being formed on one side of said TAC film was attached to obtain a polarizing plate of the present invention. To attach the TAC film, an adhesive of an aqueous polyvinyl alcohol solution was used. An acrylic acid ester-based adhesive was applied to the surface with no hard coat layer being formed, of the obtained polarizing plate, and further, an AR (antireflection) multi-coating was applied to the outside of the hard coat layer by vacuum vapor deposition. The obtained polarizing plate with an AR layer was cut into a size of 30 mm×40 mm and attached to a glass plate with a same-sized transparent AR layer on one surface to obtain a polarizing plate with an AR layer and a support of the present invention (for liquid crystal projector green channel). The polarizing plate with an AR layer and a support of the present invention had a high polarization ratio and showed durability over a long period of time even in the state of high temperature and high humidity. In addition, it had excellent light fastness to exposure for a long period of time.

The invention claimed is:

1. A dye-based polarizing film containing in a polarizing raw film, an azo compound and/or a salt thereof, which is represented by the following formula (7):

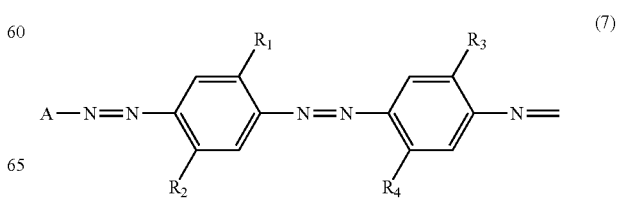

-continued

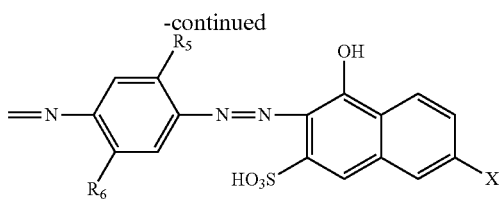

wherein, A represents a phenyl group, $R_1$ to $R_6$ each independently represent a hydrogen atom, an alkyl group having a carbon atom number of 1 to 5, an alkoxy group having a carbon atom number of 1 to 5, or an alkoxy group having a sulfo group and a carbon atom number of 1 to 5, X represents a phenylamino group, a phenylazo group, or a naphthotriazole group, wherein A is a phenyl group represented by the following formula (6):

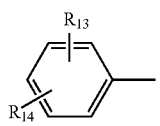

(6)

wherein, one of $R_{13}$ and $R_{14}$ is a sulfo group and the other represents a hydrogen atom, a sulfo group, an alkyl group having a carbon atom number of 1 to 5, or an alkoxy group having a carbon atom number of 1 to 5;

wherein the phenylamino group is represented by the following formula (2):

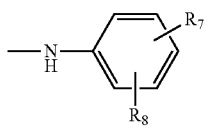

(2)

wherein, $R_7$ and $R_8$ each independently represent a hydrogen atom, a methyl group, a methoxy group, a sulfo group, an amino group or a substituted amino group;

wherein the phenylazo group is represented by the following formula (5):

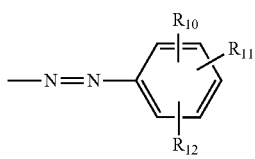

(5)

wherein, $R_{10}$ to $R_{12}$ each independently represent a hydrogen atom, a hydroxy group, an alkyl group having a carbon atom number of 1 to 5, an alkoxy group having a carbon atom number of 1 to 5, an amino group or a substituted amino group; and wherein the naphthotriazole group is represented by the following formula (4):

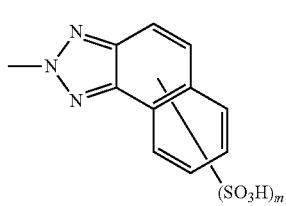

(4)

wherein, m represents 1 or 2.

2. The dye-based polarizing film containing the azo compound and/or a salt thereof according to claim 1, wherein $R_1$ to $R_6$ are each independently a hydrogen atom, a methyl group, a methoxy group, a sulfo group, an alkoxy group having a sulfo group and a carbon atom number of 1 to 5.

3. The dye-based polarizing film containing the azo compound and/or a salt thereof according to claim 1, wherein A is a disulfo-substituted phenyl group ($R_{13}$ and $R_{14}$ are sulfo groups), $R_2$, $R_4$ and $R_6$ are each independently a methyl group or a methoxy group, $R_1$ and $R_3$ are each independently a hydrogen atom, a methyl group, a methoxy group or a sulfopropoxy group, $R_5$ is a methyl group or a methoxy group, and X is a unsubstituted phenylamino group ($R_7$ and $R_8$ are hydrogen atoms), a phenylamino group having at least one of $R_7$ and $R_8$ selected from the group consisting of a methoxy group, a sulfo group and an amino group as a substituent, or a disulfo-substituted naphthotriazole (m=2).

4. The dye-based polarizing film containing the azo compound and/or a salt thereof according to claim 3, wherein $R_2$ and $R_4$ are methyl groups, $R_6$ is a methyl group or a methoxy group, and X is an unsubstituted phenylamino group ($R_7$ and $R_8$ are hydrogen atoms) or a methoxy-substituted phenylamino group (one of $R_7$ and $R_8$ is a hydrogen atom and the other is a methoxy group).

5. The dye-based polarizing film containing at least one kind of the azo compound and/or a salt thereof according to claim 1 and at least one kind of other organic dye.

6. The dye-based polarizing film containing at least one kind of the azo compound and/or a salt thereof according to claim 1 and at least two kinds of other organic dyes.

7. The dye-based polarizing film containing at least one kind of the azo compound and/or a salt thereof according to claim 1 is a color dye-based polarizing film.

8. The dye-based polarizing film according to claim 1, wherein the polarizing raw film is a film comprising a polyvinyl alcohol resin, a vinyl alcohol copolymer resin or a modified polyvinyl alcohol resin.

9. The dye-based polarizing film according to claim 8, wherein the polarizing raw film is a polyvinyl alcohol resin film.

10. A dye-based polarizing plate with a transparent protective film being attached on at least one surface of the dye-based polarizing film according to claim 1.

11. A liquid crystal display equipped with the dye-based polarizing plate according to claim 10.

12. A liquid crystal display comprising the dye-based polarizing film according to claim 1.

13. A liquid crystal projector comprising the dye-based polarizing film according to claim 1.

* * * * *